United States Patent
Endo et al.

(10) Patent No.: US 7,455,343 B2
(45) Date of Patent: Nov. 25, 2008

(54) PASSENGER'S WEIGHT MEASUREMENT DEVICE FOR VEHICLE SEAT AND ATTACHMENT STRUCTURE FOR LOAD SENSOR

(75) Inventors: Shigeru Endo, Tochigi (JP); Kenji Sato, Tochigi (JP); Harutomi Nishide, Wako (JP); Tatsuya Yamazaki, Wako (JP); Naotaka Kumakiri, Wako (JP); Mikihito Kojima, Wajo (JP); Masashi Yoshifuku, Wako (JP); Takashi Furukawa, Wako (JP)

(73) Assignees: TS Tech Co., Ltd., Asaka (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/518,458

(22) Filed: Sep. 11, 2006

(65) Prior Publication Data

US 2007/0057527 A1    Mar. 15, 2007

(30) Foreign Application Priority Data

Sep. 12, 2005   (JP)   ............................. 2005-264002
Sep. 12, 2005   (JP)   ............................. 2005-264128
Sep. 15, 2005   (JP)   ............................. 2005-268465

(51) Int. Cl.
B60N 2/42   (2006.01)
(52) U.S. Cl. .................................. 296/68.1; 296/65.13
(58) Field of Classification Search ............... 296/1.04, 296/65.01, 65.13, 68.1; 297/216.1; 280/734, 280/735
See application file for complete search history.

(56) References Cited

U.S. PATENT DOCUMENTS 5,863,098 A * 1/1999 Kojima et al. .......... 297/344.15
5,991,676 A * 11/1999 Podoloff et al. ................ 701/45
6,039,344 A * 3/2000 Mehney et al. .............. 280/735
6,069,325 A * 5/2000 Aoki ........................... 177/136
6,161,891 A   12/2000 Blakesley
6,227,596 B1 * 5/2001 Foucault et al. .......... 296/65.13
6,250,671 B1 * 6/2001 Osmer et al. ................ 280/735
6,288,649 B1 * 9/2001 Wolfe ......................... 340/667
6,318,802 B1 * 11/2001 Sjostrom et al. ......... 297/344.1

(Continued)

FOREIGN PATENT DOCUMENTS

JP   U-5-43031   6/1993

(Continued)

Primary Examiner—D. Glenn Dayoan
Assistant Examiner—Paul A Chenevert
(74) Attorney, Agent, or Firm—Oliff & Berridge PLC

(57) ABSTRACT

There is disclosed a passenger's weight measurement device for a vehicle seat, capable of suppressing generation of an initial load. The passenger's weight measurement device includes an upper rail disposed to be movable back and forth on a lower rail fixed to a vehicle floor; a load sensor fixed on the upper rail; and a frame disposed on the load sensor and below a vehicle seat, wherein a rod extends from the load sensor to penetrate the frame and to be inserted into an insertion hole formed in a center of a leaf spring, the leaf spring is curved into an angle shape to separate the center of the leaf spring from the frame, a nut is engaged with the rod on the leaf spring, and both hems of the leaf spring abut on the frame in a state that the leaf spring is fastened by the nut.

10 Claims, 17 Drawing Sheets

U.S. PATENT DOCUMENTS

| | | | | |
|---|---|---|---|---|
| 6,323,443 | B1* | 11/2001 | Aoki et al. | 177/144 |
| 6,323,444 | B1* | 11/2001 | Aoki | 177/144 |
| 6,342,683 | B1* | 1/2002 | Aoki et al. | 177/144 |
| 6,345,543 | B1* | 2/2002 | Aoki | 73/862.474 |
| 6,375,247 | B1* | 4/2002 | Volz et al. | 296/66 |
| 6,595,570 | B2* | 7/2003 | Susko | 296/68.1 |
| 6,631,879 | B2* | 10/2003 | Hibino et al. | 248/429 |
| 6,916,997 | B2* | 7/2005 | Thakur et al. | 177/136 |
| 6,942,273 | B1* | 9/2005 | Jseng | 296/65.15 |
| 7,091,426 | B2* | 8/2006 | Nagai et al. | 177/144 |
| 7,112,749 | B2* | 9/2006 | DiPaola et al. | 177/136 |
| 7,210,358 | B2* | 5/2007 | Yamazaki | 73/761 |
| 2003/0085060 | A1* | 5/2003 | Becker et al. | 177/144 |
| 2004/0124018 | A1* | 7/2004 | Yanagi | 177/144 |
| 2004/0164581 | A1* | 8/2004 | Mehrkens et al. | 296/65.13 |
| 2005/0061643 | A1* | 3/2005 | Rainey | 200/85 A |
| 2005/0099041 | A1* | 5/2005 | Becker et al. | 297/217.2 |
| 2005/0284668 | A1* | 12/2005 | Hida et al. | 177/136 |
| 2006/0010984 | A1* | 1/2006 | Yamazaki | 73/761 |
| 2006/0048582 | A1* | 3/2006 | Furukawa et al. | 73/856 |
| 2007/0012487 | A1* | 1/2007 | Becker et al. | 177/144 |

FOREIGN PATENT DOCUMENTS

| | | | | |
|---|---|---|---|---|
| JP | A-11-108746 | | 4/1999 | |
| JP | A 11-304579 | | 11/1999 | |
| JP | A-2003-166872 | | 6/2003 | |
| JP | A 2004-317285 | | 11/2004 | |
| JP | 2006036167 A | * | 2/2006 | |
| JP | 2007076418 A | * | 3/2007 | 177/144 |
| WO | WO 2007037374 A1 | * | 4/2007 | 177/144 |
| WO | WO 2007037375 A | * | 4/2007 | 177/144 |

* cited by examiner

PASSENGER'S WEIGHT MEASUREMENT DEVICE FOR VEHICLE SEAT AND ATTACHMENT STRUCTURE FOR LOAD SENSOR

The present disclosure claims priority to Japanese Patent Application No. 2005-264128 to Tokugan filed on Sep. 12, 2005, Japanese Application No. 2005-268465 to Tokugan filed on Sep. 15, 2005 and Japanese Application No. 2005-264002 to Tokugan filed on Sep. 12, 2005, the entire disclosures of which are herein incorporated by reference in their entirety.

BACKGROUND OF THE INVENTION

1. Field of the Invention

The present invention relates to a passenger's weight measurement device for vehicle seat, for measuring a weight of a passenger of a vehicle seat, and an attachment structure for attaching a load sensor to the passenger's weight measurement device.

2. Description of the Related Art

Recently, to improve performance of various safety devices such as a seat belt and an air bag, operations of the safety devices have been controlled in accordance with a weight of a passenger sitting on a vehicle seat in some cases. In the conventional passenger's weight measurement device for measuring a weight of a sitting passenger, a load sensor is disposed between a vehicle floor and the vehicle seat (For example, refer to JP A 2004-317285 and U.S. Pat. No. 6,161,891).

However, when the passenger's weight measurement device is assembled, when the vehicle seat is fixed to the passenger's weight measurement device, and when the passenger's weight measurement device is fixed to the vehicle floor or the like, a dimension error or an assembling position error occurs to cause very low distortion. Because an initial load is applied to the load sensor by the distortion, there is a first problem that it is difficult to accurately measure the passenger's weight.

JP A 11-304579 discloses a passenger's weight measurement device capable of simplifying characteristics of a load applied on a load sensor as much as possible.

The passenger's weight measurement device disclosed in JP A 11-304579 is equipped with a seat connection mechanism which includes an arm disposed to interconnect a seat bracket and a seat of a vehicle and to rotate up and down. The device also includes a load sensor disposed between the vehicle and the seat to detect a seat weight. The arm is pivotally attached to a pivotal shaft (pivot) of the seat side and a pivot of a car body side, and the load sensor selectively receives an up-and-down direction component of the seat weight applied on the arm. According to the passenger's weight measurement device disclosed in JP A 11-304579, displacement of the seat with respect to the vehicle body, which is caused when a load is applied on the seat, has certain regularity, and characteristics of the load applied on the load sensor are simplified, thereby facilitating capturing of the passenger's weight on the seat.

According to the passenger's weight measurement device disclosed in JP A 11-304579, seat adjusters project from four positions, front, back, left and right, of a bottom surface of a seat cushion on which the passenger sits. The seat adjuster is a portion of which a seat frame partially projects, and can slide back and forth on a pair of seat rails by passenger's adjustment. The seat adjuster and the seat rails constitute a so-called slide rail. However, the passenger's weight measurement device disclosed in JP A 11-304579 has a problem that the large number of components such as a linking member is increased because the pair of slide rails and the seat bracket fixed to the vehicle body floor side are linked together by a parallelogram linking mechanism. Because the parallelogram linking mechanism is disposed between the pair of slide rails and the seat bracket, there is a problem that it is difficult to set a height from the vehicle body floor to an upper surface of the seat cushion equal to or less than a certain height.

To solve the aforementioned problems, a plurality of compression type load cells (load sensors) are disposed between the pair of slide rails arranged on the vehicle body floor side and the pair of side frames for supporting the seat. Thus, the configuration is simplified and the restrictions on the height from the vehicle body floor to the upper surface of the seat cushion are eliminated. However, generally it is difficult to accurately fix the pair of slide rails and the like to the vehicle body floor side. Further, it is difficult to maintain a facing distance between the pair of side frames because of the seat sliding. In this structure, there is a second problem that an unnecessary force is applied on the load cell to interfere with passenger's load measurement.

SUMMARY OF THE INVENTION

In connection with the first problem, it is an object of the present invention to provide a passenger's weight measurement device for a vehicle seat, and an attachment structure for a load sensor, capable of suppressing generation of an initial load.

In connection with the second problem, it is another object of the present invention to provide a passenger's weight measurement device which includes a pair of slide rails and load cells arranged at four corners of the slidable seat and which can prevent interference with load measurement of the load cells.

In accordance with a first aspect of the present invention, a passenger's weight measurement device for a vehicle seat comprises an upper rail disposed to be movable back and forth on a lower rail fixed to a vehicle floor; a load sensor fixed on the upper rail; and a frame disposed on the load sensor and below a vehicle seat, wherein a rod extends from the load sensor to penetrate the frame and to be inserted into an insertion hole formed in a center of a leaf spring, the leaf spring is curved into an angle shape to separate the center of the leaf spring from the frame, a nut is engaged with the rod on the leaf spring, and both hems of the leaf spring abut on the frame in a state that the leaf spring is fastened by the nut.

In accordance with a second aspect of the present invention, in an attachment structure for attaching a load sensor to a frame disposed below a vehicle seat, a rod extends from the load sensor to penetrate the frame and to be inserted into an insertion hole formed in a center of a leaf spring, the leaf spring is curved into an angle shape to separate the center of the leaf spring from the frame, a nut is engaged with the rod on the leaf spring, and both hems of the leaf spring abut on the frame in a state that the leaf spring is fastened by the nut.

In accordance with the first and second aspects, preferably, a collar through which the rod is inserted penetrates the frame, the leaf spring is held between the collar and the nut, and the leaf spring and the collar are held between the nut and the load sensor.

In accordance with the first and second aspect, preferably, the rod is inserted into the insertion hole in a position shifted from a line segment for interconnecting the both hems of the leaf spring when seen towards an inserting direction of the rod.

In accordance with the first and second aspects, preferably, holes are formed in the both hems of the leaf spring, and a part of a cover covering the both hems of the leaf spring is inserted into the holes.

According to the first and second aspects, because the leaf spring is curved into an angle shape to separate the center of the leaf spring from the frame, and the nut is engaged with the rod from above the leaf spring, the frame is shifted in a vertical direction with respect to the load sensor. The fastening of the nut elastically deforms the leaf spring.

According to the first and second aspects of the present invention, the frame is shifted in the vertical direction with respect to the load sensor. Thus, even when the left and right lower rails, the left and right upper rails, the frame, or the like is distorted during assembling, it is possible to avoid applying an initial load generated by the distortion on the load sensor.

Because both hems of the leaf spring are in contact with the frame by fastening the nut, the load sensor is not loosened with respect to the frame. Thus, it is possible to suppress a reduction in rigidity.

Because the elastic deformation of the leaf spring by the nut applies a load on the nut from the leaf spring, it is possible to prevent loosening of the nut.

In accordance with a third aspect of the present invention, a passenger's weight measurement device for a vehicle seat comprises a pair of left and right upper rails disposed to be movable back and forth on a pair of left and right lower rails fixed to a vehicle floor; four load sensors fixed on front and rear sides of the pair of upper rails; and a frame disposed on the four load sensors and below the vehicle seat, wherein two of the four load sensors, which are arranged on one diagonal line, are set to play in back-and-forth and left-and-right directions with respect to the frame, and the other two load sensors arranged on the other diagonal line are fixed in back-and-forth and left-and-right directions with respect to the frame.

According to the third aspect of the present invention, because the two load sensors located on one diagonal line are set to play back and forth and left and right with respect to the frame, even when distortion occurs in the upper rail or the lower rail, the load sensors located on one diagonal line are horizontally shifted with respect to the frame. Thus, no initial load generated by distortion is applied on the load sensors.

In accordance with a fourth aspect of the present invention, a passenger's weight measurement device for a vehicle seat employs a structure in which a pair of side frames supporting the seat is structured to be rigid, a pair of load cells located on one diagonal line among four load cells disposed between the seat and a vehicle floor are moveable up and down, and a pair of load cells located on the other diagonal line are moveable up and down and play.

More specifically, in accordance with the fourth aspect of the present invention, a passenger's weight measurement device for a vehicle seat comprises a pair of slide rails arranged in a vehicle floor; a pair of side frames for supporting the seat; and load cells disposed at four corners of the pair of slide rails and the pair of side frames, wherein the pair of side frames constitute a rectangular seat frame with a set of first connection frames for connecting both ends the pair of side frames extending in parallel so as to be perpendicular to the pair of side frames.

According to the fourth aspect, the pair of side frames constitute a rectangular seat frame with a set of first connection frames for connecting both ends the pair of side frames extending in parallel so as to be perpendicular to the pair of side frames. Thus, the pair of side rails and the set of first connection frames are connected together, thereby providing a highly rigid rectangular seat frame.

The high rigidity of the seat frame may mean that distortion of the seat frame with respect to a force applied on the seat frame is small, for example, displacement of the pair of side rails may be small with respect to a force (compression stress) applied in a mutually approaching direction of the pair of side rails, or displacement of the pair of side rails may be small with respect to a force (tension stress) applied in a mutually separating direction of the pair of side rails. According to the fourth aspect of the present invention, it is prevented that an unnecessary force is applied on the load cell when the pair of side frames slide together with the load cell on the slide rail. Then, it is possible to accurately measure passenger's load.

In accordance with the fourth aspect, preferably, in the pair of slide rails, a pair of first slide rails and a pair of second slide rails are connected so as to be slidable, respectively, the pair of first slide rails extend in parallel to be fixed to the vehicle floor side, and the pair of first slide rails comprise a second connection frame for connecting middle parts of the pair of first slide rails so as to be perpendicular to the first slide rails.

In this case, the pair of first slide rails and the second connection frame are connected together to provide a highly rigid H-shaped frame (H-frame). The high rigidity of the H-frame may mean that distortion of the H-frame with respect to a force applied on the H-frame is small, for example, displacement of the pair of first side rails may be small with respect to a force (compression stress) applied in a mutually approaching direction of the pair of first side rails, or displacement of the pair of first side rails may be small with respect to a force (tension stress) applied in a mutually separating direction of the pair of first side rails. According to the fourth aspect of the present invention, it is prevented that an unnecessary force is applied on the load cell. Then, it is possible to accurately measure passenger's load.

In accordance with the fourth aspect, preferably, the four load cells are arranged at four corners of the pair of second slide rails, and the pair of second slide rails extend in parallel, and comprises a third connection frame for connecting middle parts of the pair of second slide rails so as to be perpendicular to the second slide rails.

In this case, the pair of second slide rails and the third connection frame are connected together to provide a highly rigid H-frame. The high rigidity of the H-frame may mean that distortion of the H-frame with respect to a force applied on the H-frame is small, for example, displacement of the pair of second side rails may be small with respect to a force (compression stress) applied in a mutually approaching direction of the pair of second side rails, or displacement of the pair of second side rails may be small with respect to a force (tension stress) applied in a mutually separating direction of the pair of second side rails. According to the fourth aspect of the present invention, it is prevented that an unnecessary force is applied on the load cell. Then, it is possible to accurately measure passenger's load.

In accordance with the fourth aspect, preferably, a pair of load cells located on one diagonal line among the four load cells are connected to be movable up and down with respect to the seat frame, and a pair of load cells located on the other diagonal line are connected to be movable up and down and play with respect to the seat frame.

In this case, it is possible to absorb manufacturing errors of the pair of slide rails, the four load cells, and the pair of side frames, and height-direction accumulated errors of these components. It is also possible to absorb assembling errors of the pair of slide rails, the four load cells, and the pair of seat frames.

In accordance with the fourth aspect, preferably, in the set of first connection frames, one of the first connection frames is connected to ends of the pair of side rails so as to be easily deformed by shock having a predetermined or more strength.

For example, in the pair of side frames, a pair of tongue pieces extend in one ends, and one of the first connection frames is connected to tips of the pair of tongue pieces. Constrictions are disposed in base ends of the pair of tongue pieces, and shock stress concentrates on these constrictions. According to the fourth aspect of the present invention, by employing a structure easily deformed by shock having a predetermined or more strength, it is possible to protect the load cells from shock having a predetermined or more strength.

In accordance with the fourth aspect, preferably, the load cell comprises a male screw in one end and a flange in the other end located to face opposite to the one end, in the seat frame, four holes are formed to insert the male screws corresponding to an arrangement of the four load cells, the pair of second slide rails are fixed to the flanges, first elastic bushings are inserted into a pair of first holes located on one diagonal line among the four holes, a first collar is elastically disposed between the first elastic bushing and the male screw, a plain washer and a conical spring washer are mounted on the first collar, and a nut is fastened to the male screw, in a region of the seat frame, which is engaged with the pair of male screws located on the one diagonal line, an up-and-down moving amount is regulated by a length of the first collar in an axial direction, and the conical spring washer presses the seat frame to the load cell side.

In this case, it is possible to realize a connection structure movable up and down by general mechanical elements. It is also possible to absorb manufacturing errors of the pair of slide rails, the four load cells and the seat frames, and height-direction accumulated errors of these components.

In accordance with the fourth aspect, preferably, second elastic bushings are inserted into a pair of second holes located on the other diagonal line among the four holes, a second collar is inserted after a plain washer is inserted into the male screw, the second elastic bushing is disposed to play in the second collar, a conical spring washer are mounted on the second collar, and a nut is fastened to the male screw, in a region of the seat frame, which is engaged with the pair of male screws located on the other diagonal line, an up-and-down moving amount is regulated by a length of the second collar in an axial direction, and the conical spring washer presses the seat frame to the load cell side.

In this case, it is possible to realize a connection structure permitted to move up and down and to play by general mechanical elements. It is also possible to absorb manufacturing errors of the pair of slide rails, the four load cells and the seat frames, and height-direction accumulated errors of these components.

In accordance with the fourth aspect, preferably, an inner diameter of the first elastic bushing is formed in a conical body, and an inner periphery of an upper bottom surface of the conical body having a small radius abuts on an outer periphery of the first collar.

In this case, it is possible to realize both of facilitation of assembling and absorption of assembling errors by forming the inner diameter of the first elastic bushing in the conical body.

According to the fourth aspect of the present invention, the pair of side frames supporting the seat and a set of first connection frames are connected together to provide a highly rigid rectangular seat frame. The pair of slide rails and the second and third connection frames are connected together to provide a highly rigid H-frame. For example, it is possible to prevent tilting of the load cell by moving the pair of side frames in a mutually separating direction. According to the fourth aspect of the present invention, it is possible to provide a passenger's weight measurement device for a vehicle seat, capable of preventing interference with load cell load measurement without increasing the number of components and without greatly changing the framework of the conventional seat structure.

Furthermore, according to the fourth aspect of the present invention, it is possible to absorb manufacturing errors of the pair of slide rails, the four load cells and the seat frames, and height-direction accumulated errors of these components. It is also possible to absorb horizontal accumulated errors of the components caused by assembling.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENT OF THE INVENTION

The preferred embodiments of the present invention will be described below with reference to the accompanying drawings. In the embodiments described below, various preferable technical limitations are described to carry out the invention, but the scope of the invention is not limited to the embodiment and the examples shown in the figures.

First Embodiment

Figure 1:
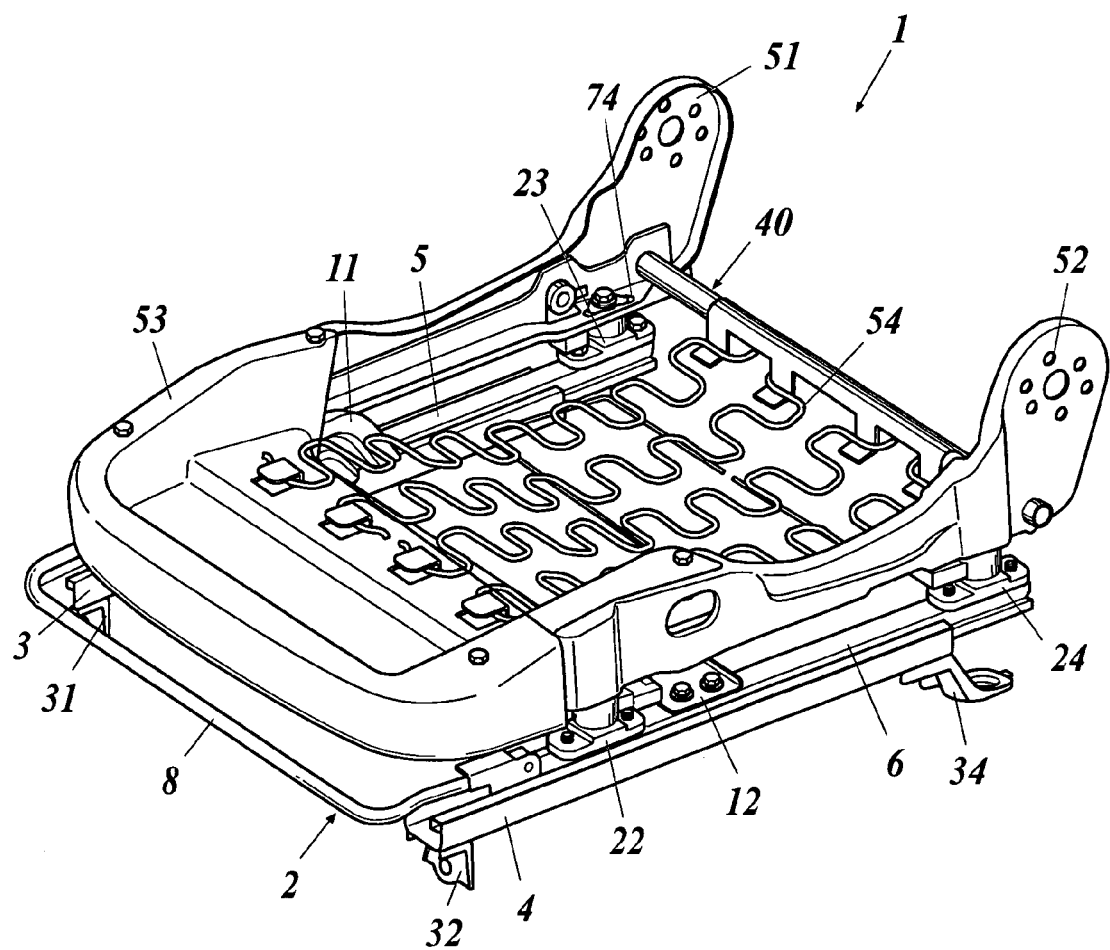
FIG. 1 is a perspective diagram showing a passenger's weight measurement device for a vehicle seat.
Figure 2:
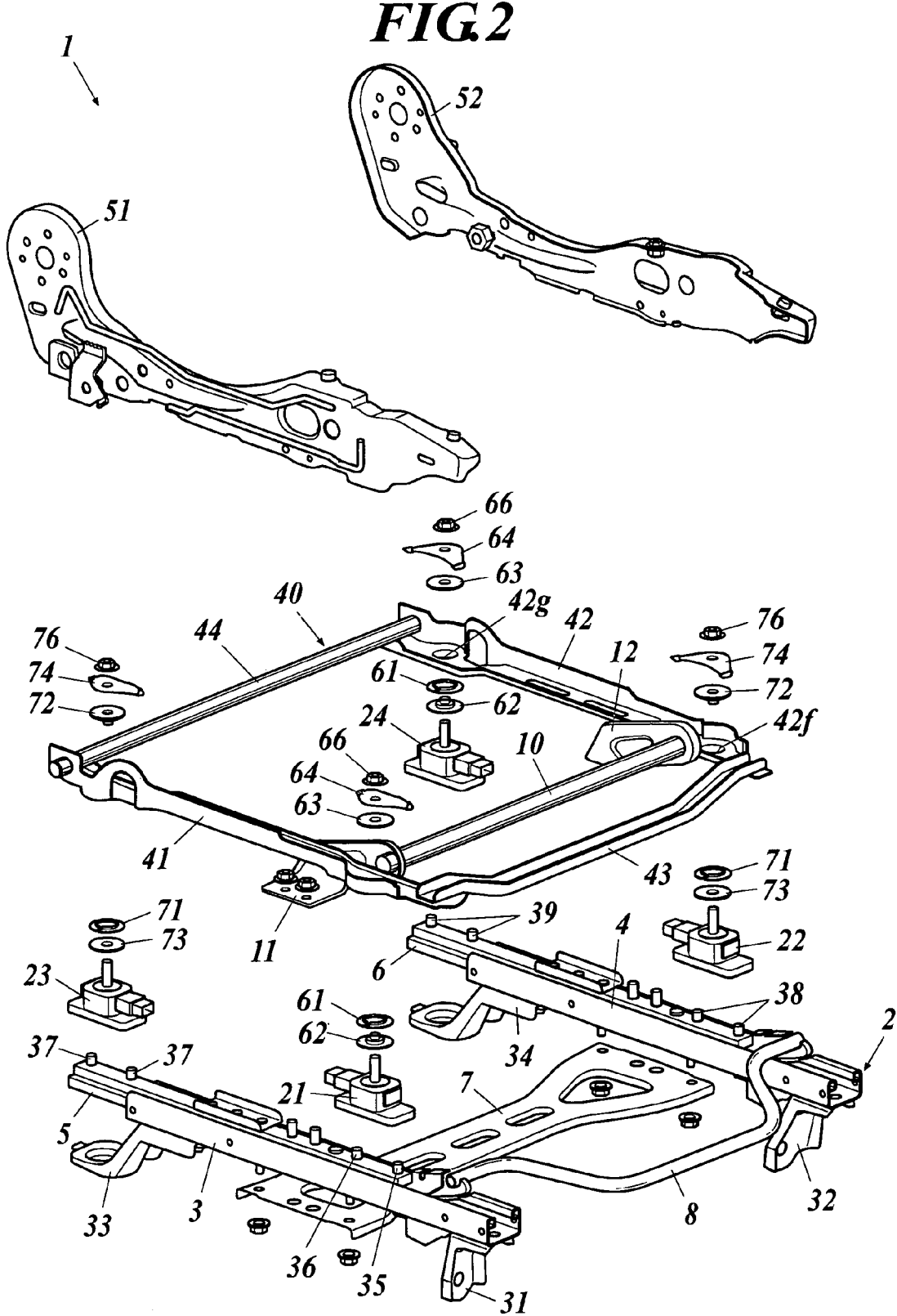
FIG. 2 is an exploded perspective diagram showing the passenger's weight measurement device.

FIG. 1 is a perspective diagram of a passenger's weight measurement device 1 for a vehicle seat, and FIG. 2 is an exploded perspective diagram of the passenger's weight measurement device 1.

As shown in FIGS. 1 and 2, a slide adjuster 2 for adjusting a back-and-forth position of the vehicle seat is mounted to a floor of a passenger's room. The slide adjuster 2 includes lower rails 3 and 4 disposed in parallel with each other, an upper rail 5 engaged with the lower rail 3 to slide back and forth on the lower rail 3 with respect to the same, an upper rail 6 engaged with the lower rail 4 to slide back and forth on the lower rail 3 with respect to the lower rail 4, a lower bracket 7 fixed to bottom surfaces of the lower rails 3 and 4 by bolts and nuts or rivets to bridge a gap therebetween, a lock mechanism 8 for locking/unlocking the upper rails 5 and 6 to/from the lower rails 3 and 4, brackets 31 and 33 fixed to the bottom surface of the lower rail 3, and brackets 32 and 34 fixed to the bottom surface of the lower rail 4. The brackets 31 to 34 are mounted to the vehicle floor, and the lower rails 3 and 4 are fixed to the vehicle floor.

A bracket 11 is fixed to a back-and-forth direction center of an upper surface of the right upper rail 5 by bolts and nuts or rivets, and a bracket 12 is fixed to a back-and-forth direction center of an upper surface of the left upper rail 6 by bolts and nuts or rivets. Both brackets 11 and 12 are disposed to be upright on the upper surfaces of the upper rails 5 and 6. A right end of a submarine pipe 10 is welded to the bracket 11, and a left end of the submarine pipe 10 is welded to the bracket 12, thereby installing the submarine pipe 10 between the brackets 11 and 12.

A load sensor 21 is mounted on a front end of the upper surface of the right upper rail 5, and a load sensor 23 is mounted on a rear end of the upper surface of the right upper rail 5. Similarly, a load sensor 22 is mounted on a front end of the upper surface of the left upper rail 6, and a load sensor 24 is mounted on its rear end. Seen from the above, the load sensors 21 to 24 are arranged to be apexes of a square or a rectangle.

Figure 3:
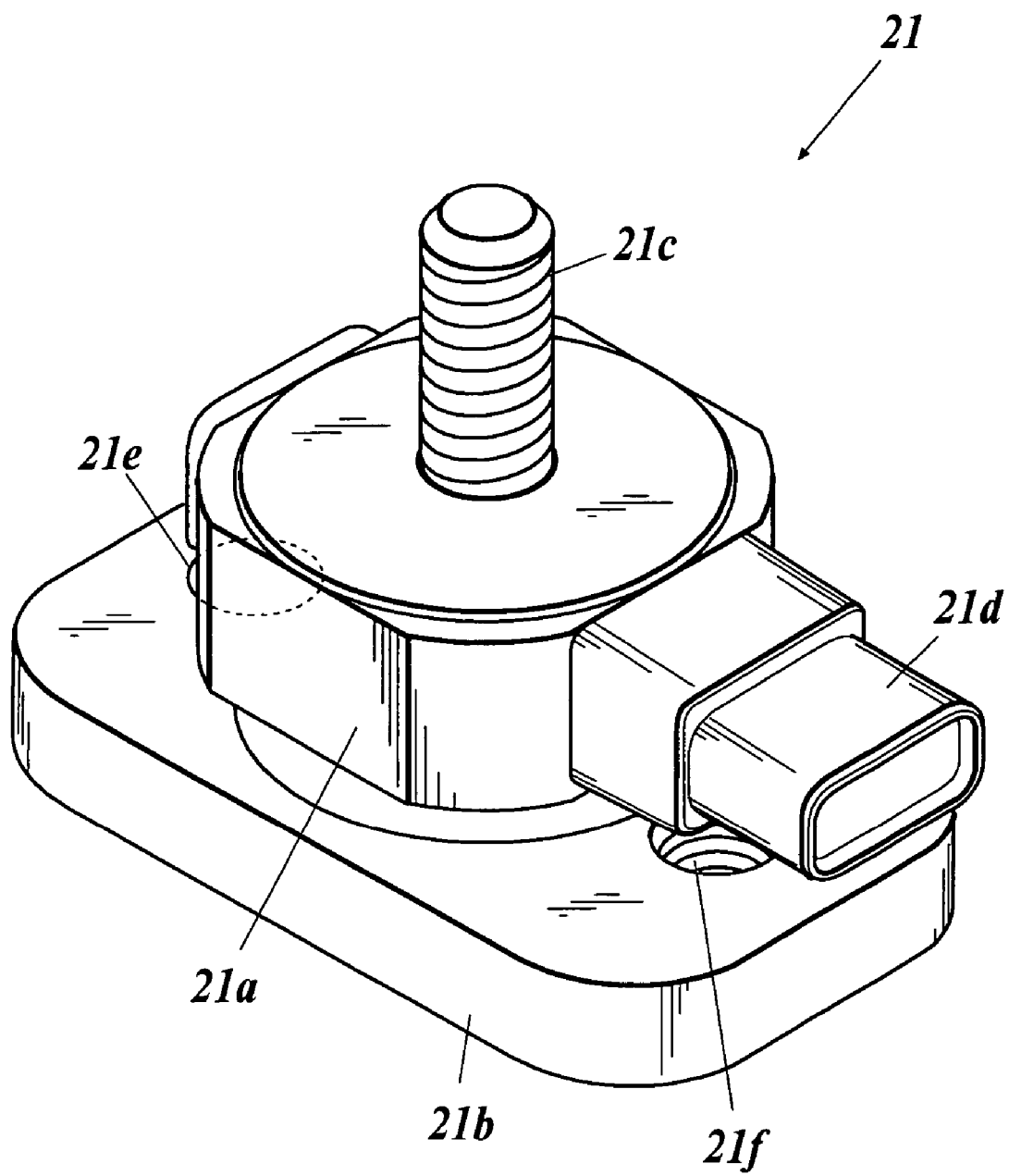
FIG. 3 is a perspective diagram showing a load sensor.

FIG. 3 is a perspective diagram of the load sensor 21. As shown in FIG. 3, the load sensor 21 includes a columnar sensing section 21a for detecting a load, a platelike flange section 21b extending laterally back and forth from a lower end of the sensing section 21a, a rod 21c extending from an upper end of the sensing section 21a upward, and a connector 21d extending from the sensing section 21a to be parallel to the flange section 21b. The rod 21c is formed into a male screw shape. Female screw-shaped circular holes 21e and 21f put-through up and down are formed in front and rear parts of the flange section 21b. The sensing section 21a incorporates a strain gauge for converting a load into an electric signal.

As shown in FIG. 2, the load sensor 21 is secured to the right upper rail 5. Specifically, a bottom surface of the flange section 21b abuts on the upper surface of the upper rail 5, and bolts 35 and 36 penetrating the upper rail 5 up and down are engaged with the circular holes 21e and 21f to fix the load sensor 21. The load sensor 21 may be fixed to the upper rail 5 by fastening nuts around the bolts 35 and 36 on the flange section 21b without forming any screw threads in the circular holes 21e and 21f.

The load sensors 22 to 24 are all configured as in the case of the load sensor 21. Thus, the load sensors 22 to 24 will be described by using reference numerals of sensing section 22a to 24a, flange sections 22b to 24b, rods 22c to 24c, and connector 22d to 24d.

As in the case of the load sensor 21, the load sensor 23 is fixed to the upper surface of the right upper rail 5 by a bolt 37, and the load sensors 22 and 24 are fixed to the upper surface of the left upper rail 6 by bolts 38 and 39.

In the fixed state of the load sensors 21 to 24, the connectors 23d and 24d are directed forward for the rear load sensors 23 and 24, and the connectors 21d and 22d are directed backward for the front load sensors 21 and 22.

Figure 4:
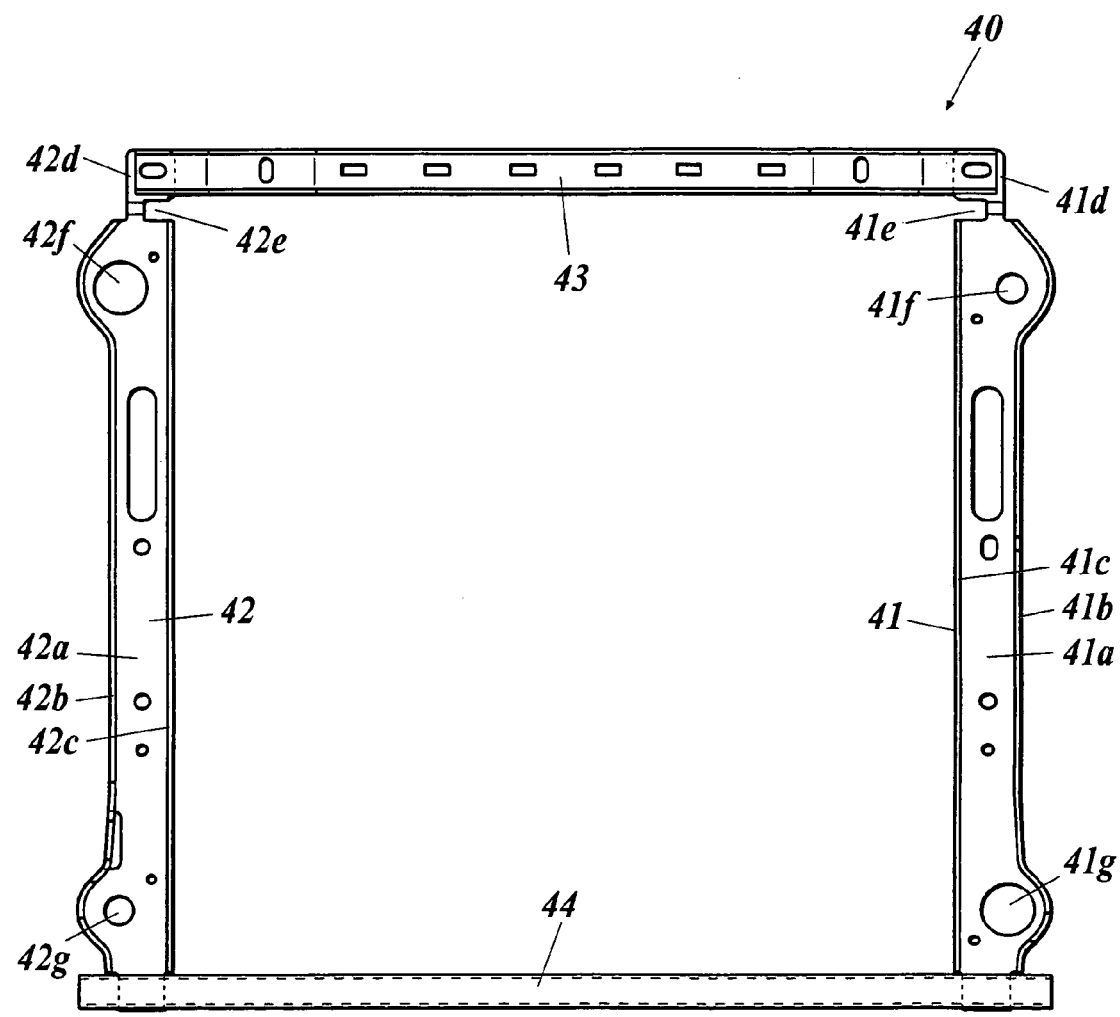
FIG. 4 is a plan diagram showing a rectangular frame.

As shown in FIGS. 1 and 2, rectangular frames 40 are mounted on the load sensors 21 to 24. FIG. 4 is a top diagram of the rectangular frame 40. As shown in FIG. 4, the rectangular frame 40 includes a right beam 41, a left beam 42, a front member 43, and a rear cross pipe 44.

The right beam 41 is a metal material having a web 41a and right and left flanges 41b and 41c and U-shaped in section. A length in front-and-rear direction of the web 41a is longer than those of the flanges 41b and 41c, and a front end 41d of the web 41a extends before front ends of the flanges 41b and 41c. A rectangular notch 41e is formed in a side edge of the front end 41d of the web 41a, and a width of this part is narrower than those of other parts. A mounting hole 41f is formed in a front of the web 41a, and a mounting hole 41g is formed in a rear part of the web 41a. The mounting hole 41f is located behind the notch 41e. A diameter of the rear mounting hole 41g is larger than that of the front mounting hole 41f.

Similarly, the left beam 42 is a metal material having a web 42a and left and right flanges 42b and 42c and U-shaped in section, and a notch 42e is formed in a side edge of a front end 42d of the web 42a. Mounting holes 42f and 42g are formed in the web 42a, back-and-forth positions of the mounting holes 42f and 41f are almost aligned with each other, back-and-forth positions of the mounting holes 42g and 41g are almost aligned with each other, and the attaching hole 42f is located behind the notch 42e. In the left beam 42, a diameter of the front mounting hole 42f is larger than that of the rear mounting hole 42g.

The front member 43 is a metal member having a web and a flange and U-shaped in section. A right end of the front member 43 is welded to the front end 41d of the web 41a on a front side of the notch 41e of the beam 41, and a left end of the front member 43 is welded to the front end 42d of the web 42a on a front side of the notch 42e of the beam 42.

The cross pipe 44 is installed between the rear ends of the beams 41 and 42 to be welded to the same. As in the case of the front notches 41e and 42e, a notch may be formed in the beam 41 between the cross pipe 44 and the load sensor 23, or in the beam 42 between the cross pipe 44 and the load sensor 24.

Figure 5:
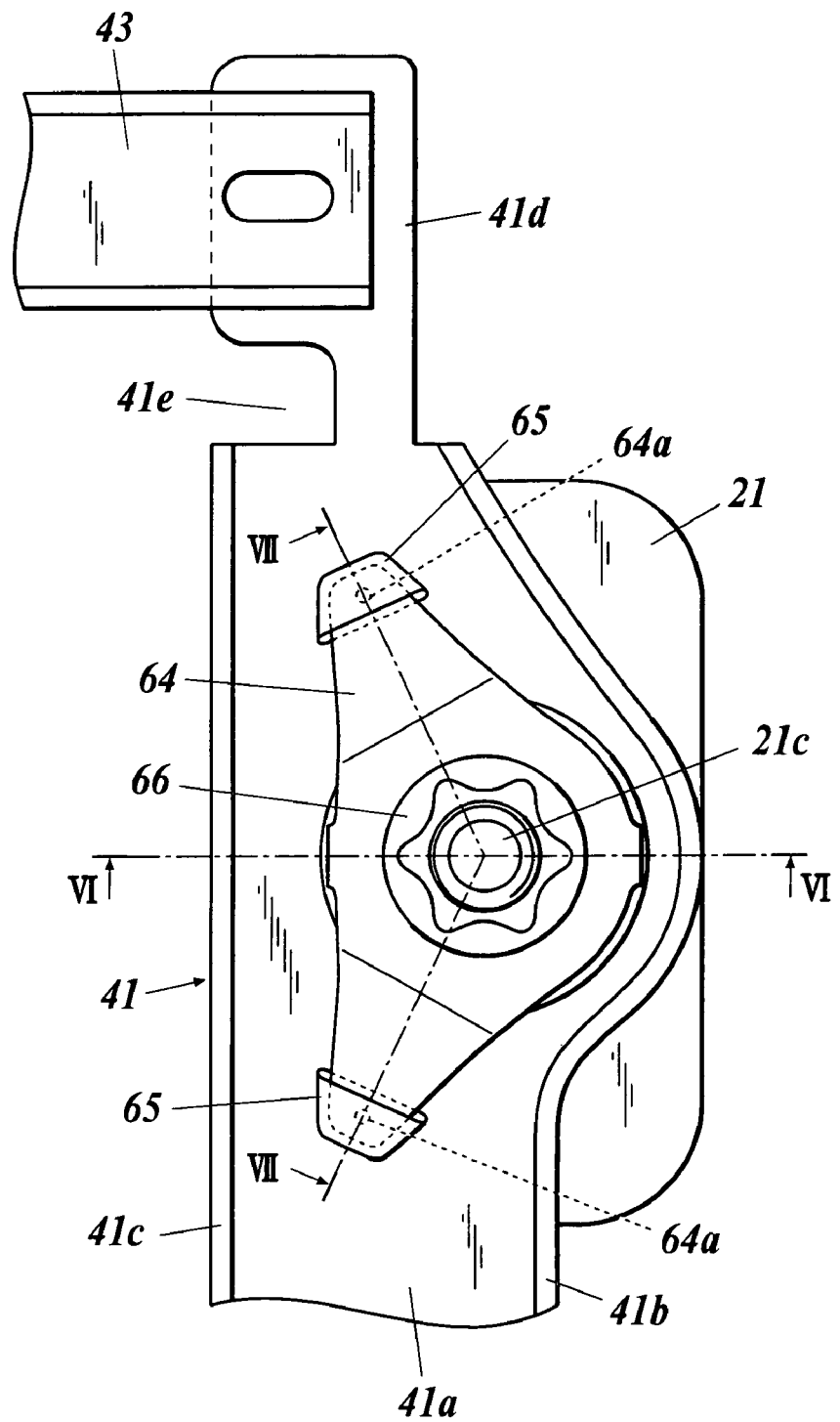
FIG. 5 is a plan diagram showing a right front section of the rectangular frame.
Figure 6:
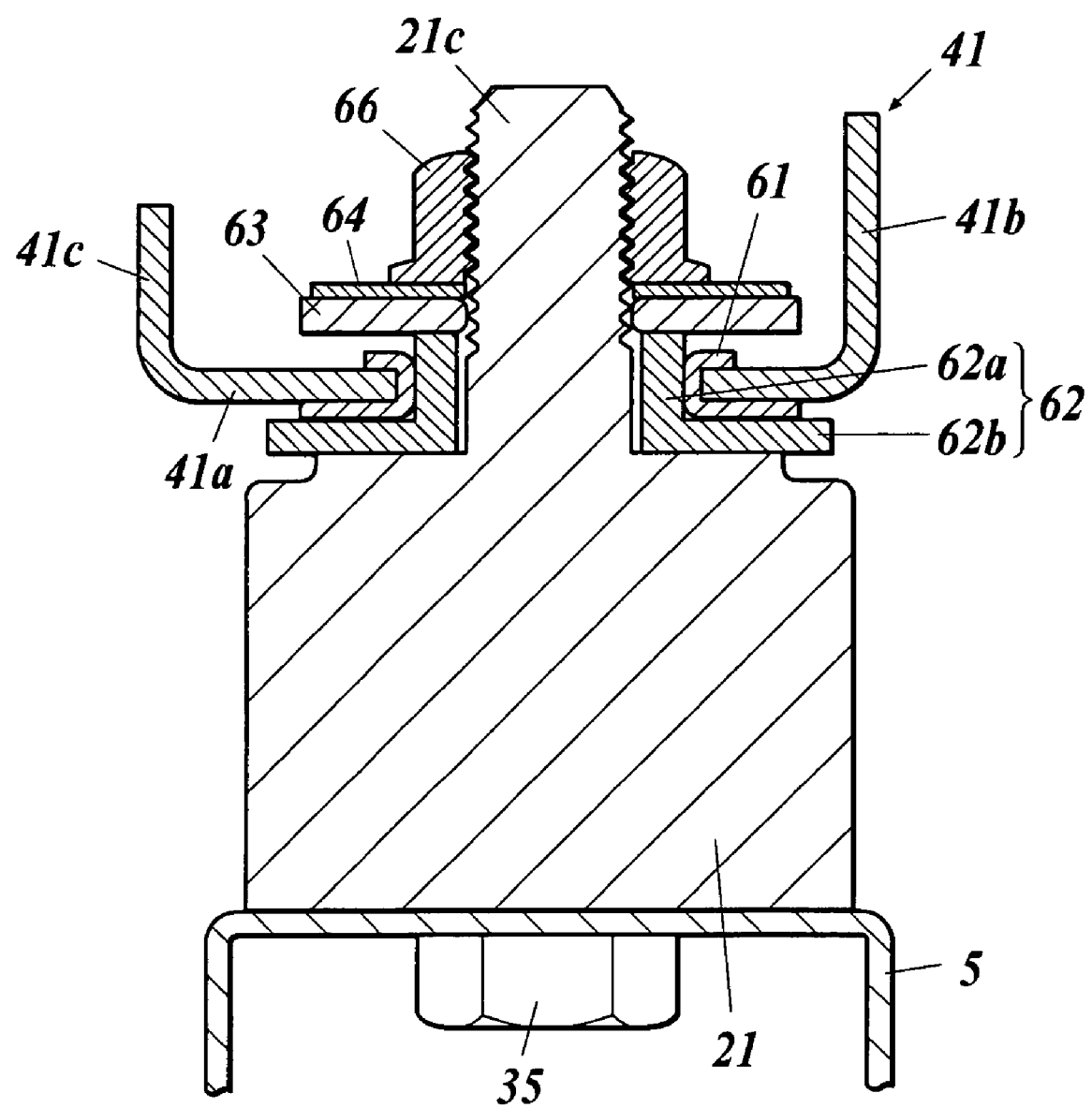
FIG. 6 is a schematic sectional diagram cut along the line VI-VI of FIG. 5.
Figure 7:
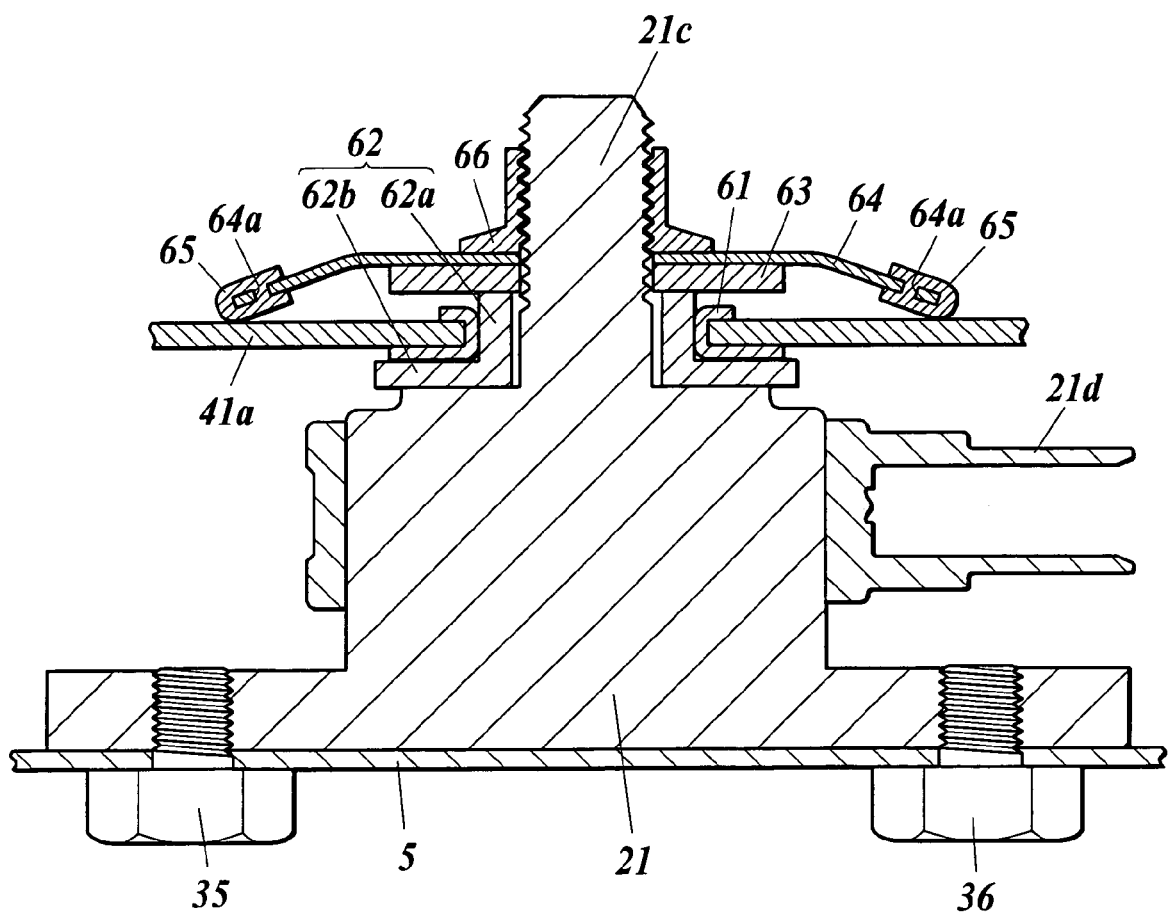
FIG. 7 is a schematic sectional diagram cut along the line VII-VII of FIG. 5.

Referring to FIGS. 5 to 7, a structure for mounting the right front load sensor 21 to the rectangular frame 40 will be described. FIG. 5 is a plan diagram of a right front part of the rectangular frame 40, FIG. 6 is a schematic sectional diagram cut along the line VI-VI, and FIG. 7 is a schematic sectional diagram cut along the line VII-VII. As shown in FIGS. 5 to 7, a ring-shaped NYLON bushing 61 is fitted in an edge of the right front mounting hole 41f, and grease is applied on the NYLON bushing 61. A stepped collar 62 constituted of a cylindrical part 62a and a ring platelike flange part 62b formed in one end surface of the cylindrical part 62a is inserted into the mounting hole 41f inside the NYLON bushing 61. In this case, the cylindrical part 62a penetrates the web 41a from bottom up, and the flange part 62b engages the bottom surface of the web 41a, thereby preventing pulling-out of the stepped collar 62 upward. The cylindrical part 62a projects more than the upper surface of the web 41a, and an upper end surface of the cylindrical part 62a is located higher than the upper surface of the web 41a. The cylindrical part 62a is fitted to the NYLON bushing 61 to leave no space between the cylindrical part 62a and the NYLON bushing 61.

The rod 21c of the load sensor 21 is inserted into the stepped collar 62, and this rod 21c penetrates the web 41a from bottom up. An inner diameter of the stepped collar 62 is designed to be slightly larger than a diameter of the rod 21c. By such designing, a dimension error and a mounting position error are prevented. Accordingly, even when the diameter of the rod 21c is smaller than the inner diameter of the stepped collar 62, the rod 21c is fixed to the beam 41 with substantially no play in back-and-forth and left-and-right directions.

A nut 66 is engaged with the rod 21c, a plain washer 63 and a leaf spring 64 are disposed between the upper surface of the web 41a of the beam 41 and the nut 66, and the nut 66 is engaged with the leaf spring 64. The rod 21c is inserted into the plain washer 63, and the plain washer 63 is mounted on an end surface of the stepped collar 62. The plain washer 63 is located apart from the upper surface of the web 41a of the beam 41.

The leaf spring 64 is formed into an isosceles triangular shape, an insertion hole is formed in its center (center of gravity of the isosceles triangle), and the rod 21c is inserted into this insertion hole. Corners of the leaf spring 64 equal to each other are covered with covers 65, and grease is applied on the covers 65. The cover 65 is formed by molding and hardening a fluid resin at the corner of the leaf spring 64, and a part of the cover 65 is inserted into a hole 64a formed at the corner of the leaf spring 64. Seen from the side, the leaf spring 64 is curved so that a center of the leaf spring 64 can be angled, and the corner covered with the cover 65 is hemmed. By fastening the nut 66, the plain washer 63 and the leaf spring 64 are held between the nut 66 and the upper end surface of the cylindrical part 62a, and the leaf spring 64, the plain washer 63 and the stepped collar 62a are held between the nut 66 and the load sensor 21. By fastening the nut 66, the covers 65 of both hems of the leaf spring 64 abut on the upper surface of the web 41a of the beam 41 to press the leaf spring 64 to the web 41a. The insertion hole into which the rod 21c has been inserted is formed in the center-of-gravity part of the leaf spring 64. Accordingly, seen from the insertion direction of the rod 21c, the rod 21c is inserted into the insertion hole in a position shifted from a line for interconnecting both corners of the leaf spring which becomes a contact between the leaf spring 64 and the web 41a.

Since the fastening of the nut 66 causes elastic deformation of the leaf spring 64, a load is applied on the nut 66 to prevent its loosening. As the rod 21c is inserted into the stepped collar 62, even when the nut 66 is excessively fastened, it is possible to prevent bonding of the entire leaf spring 64 to the upper surface of the web 41a caused by flat deformation of the leaf spring 64.

A position of the mounting hole 41f in a width direction of the web 41a is slightly right from a center, and both hems of the leaf spring 64 are in contact with a width-direction center of the web 41a.

Figure 8:
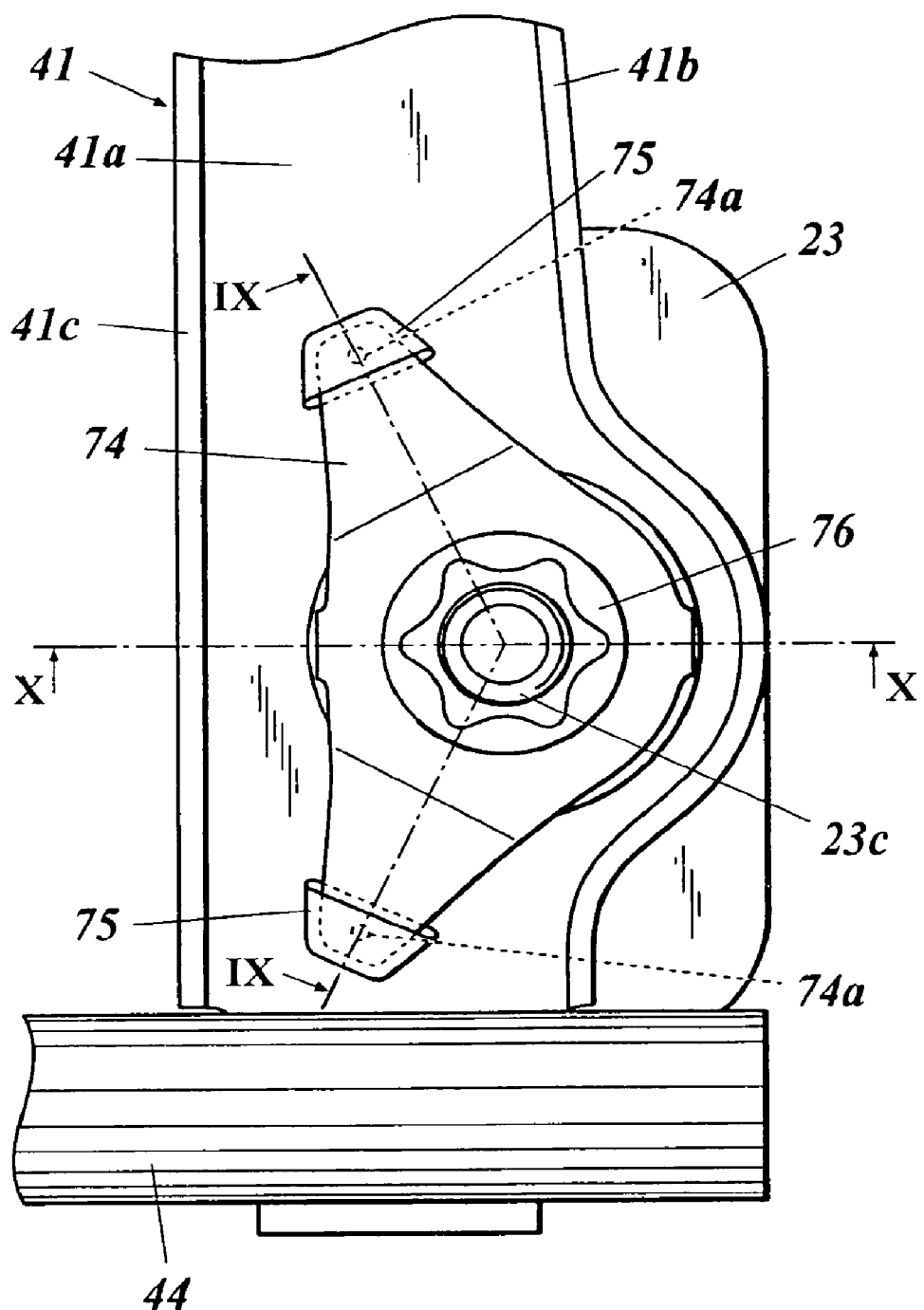
FIG. 8 is a plan diagram showing a right rear section of the rectangular frame.
Figure 9:
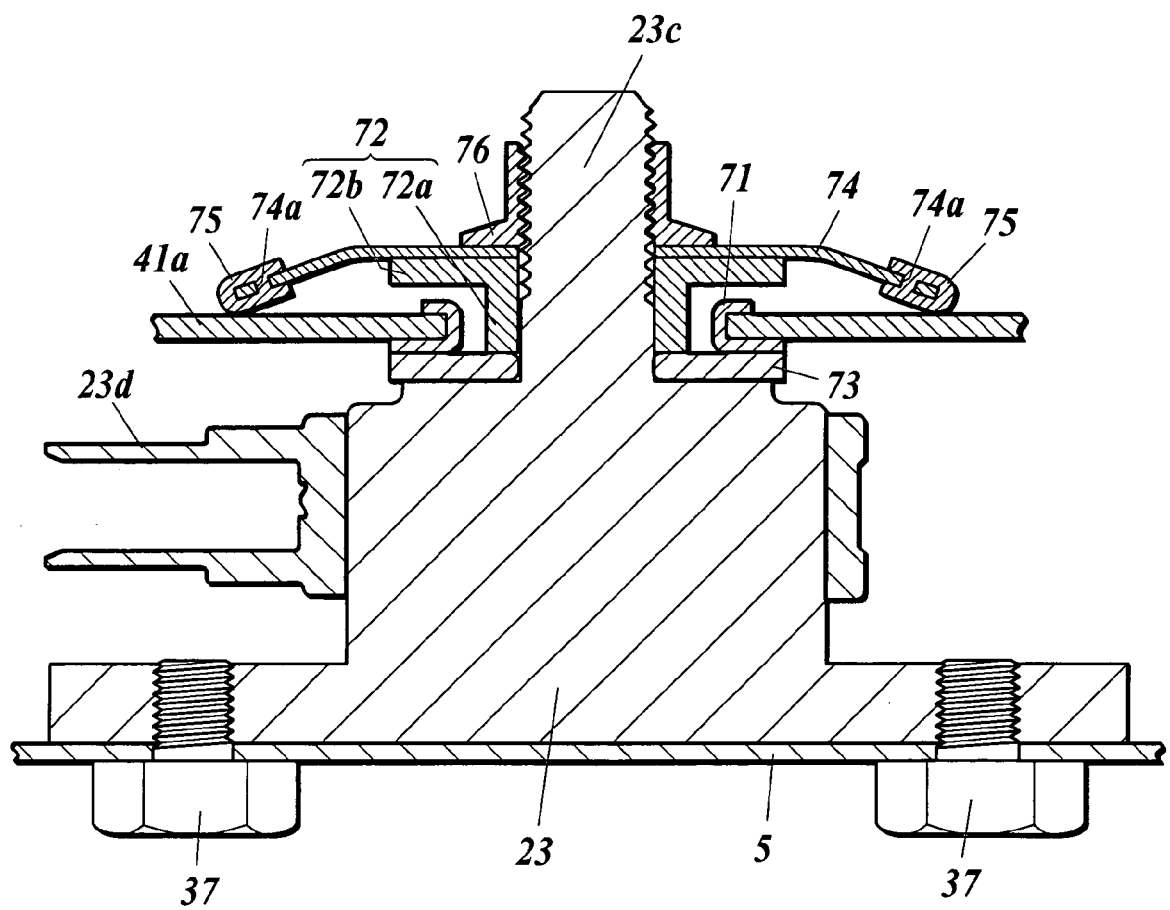
FIG. 9 is a schematic sectional diagram cut along the line IX-IX of FIG. 8.
Figure 10:
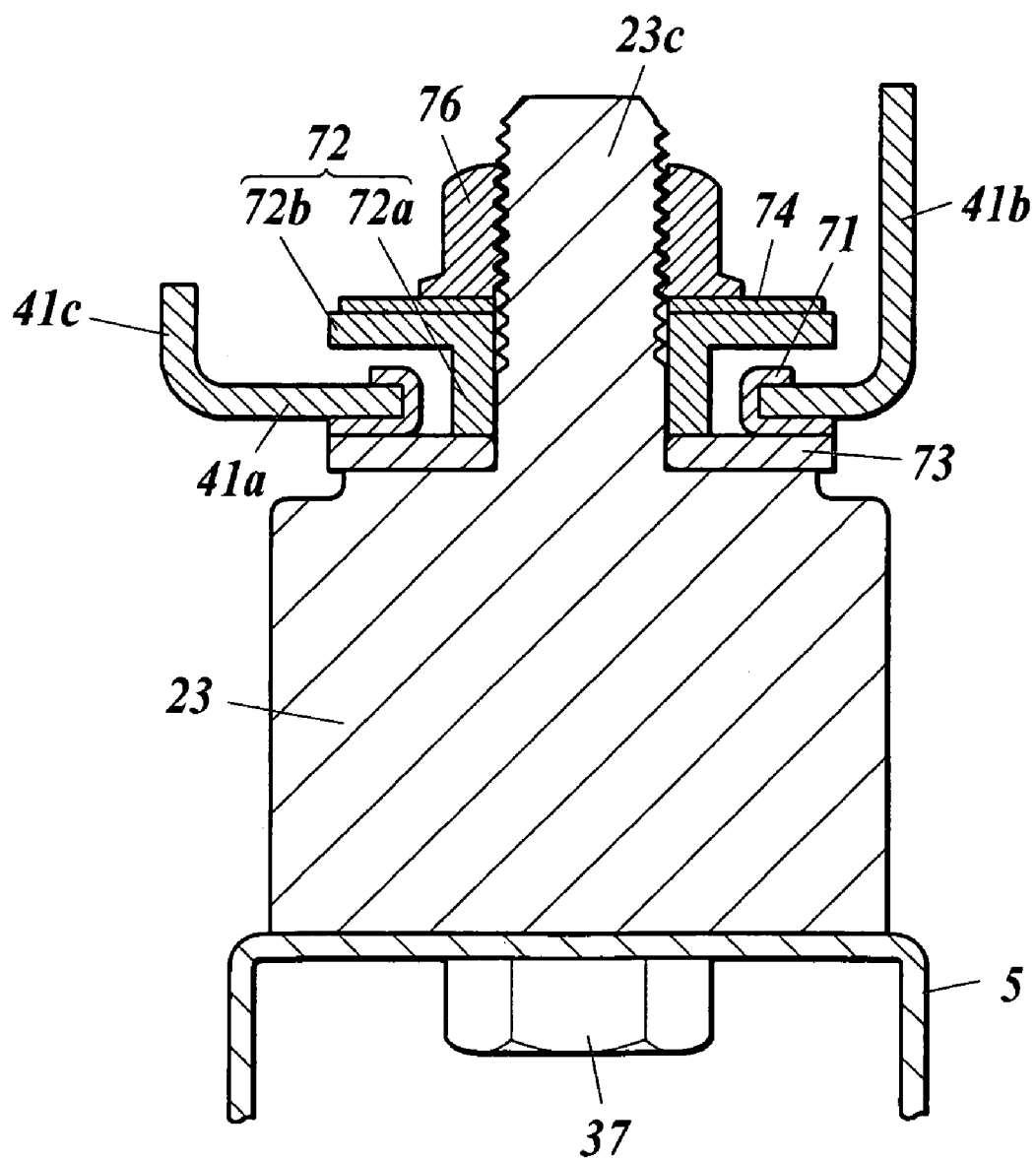
FIG. 10 is a schematic sectional diagram cut along the line X-X of FIG. 8.

Referring to FIGS. 8 to 10, a structure for mounting the right rear load sensor 23 to the rectangular frame 40 will be described. FIG. 8 is a plan diagram of a right rear part of the rectangular frame 40, FIG. 9 is a schematic sectional diagram cut along the line IX-IX, and FIG. 10 is a schematic sectional diagram cut along the line X-X.

As shown in FIGS. 8 to 10, a ring-shaped NYLON bushing 71 is fitted in an edge of the right rear mounting hole 41g, and grease is applied on the NYLON bushing 71. The rod 23c of the load sensor 23 is inserted into a plain washer 73, and inserted into the mounting hole 41g to penetrate the web 41a from bottom up. The plain washer 73 is held between the web 41a of the beam 41 and the sensor part 23a.

The rod 23c is inserted into the cylindrical part 72a of a stepped collar 72, the cylindrical part 72a penetrates the web 41a from bottom up inside the NYLON bushing 71, and a lower end surface of the cylindrical part 72a abuts on the plain washer 73. A ring-shaped flange part 72b is formed in an upper end surface of the cylindrical part 72a, and this flange part 72b is above the web 41a. The flange part 72b and the web 41a are apart from each other. An inner diameter of the stepped collar 72 is almost equal to a diameter of the rod 23c, and an outer diameter of the cylindrical part 72a is slightly smaller than a diameter of the mounting hole 41g. Thus, there is a space between an outer peripheral surface of the cylindrical part 72a and the edge of the mounting hole 41g, and the rod 23c is set with a play back and forth and left and right with respect to the beam 41.

A nut 76 is engaged with the rod 23c, a leaf spring 74 is disposed between the flange part 72b of the stepped collar 72 and the nut 76, and the nut 76 is engaged with the leaf spring 74. The leaf spring 74 is formed into an isosceles triangular shape, an insertion hole is formed in its center (center of gravity of the isosceles triangle), and the rod 23c is inserted into this insertion hole. Corners of the leaf spring 74 equal to each other are covered with covers 75, and grease is applied on the covers 75. The cover 75 is formed by molding and hardening a fluid resin at the corner of the leaf spring 74, and a part of the cover 75 is inserted into a hole 74a formed at the corner of the leaf spring 74. Seen from the side, the leaf spring 74 is curved so that a center of the leaf spring 74 can be angled, and the corner covered with the cover 75 is hemmed. By fastening the nut 76, the leaf spring 74 is held between the nut 76 and the stepped collar 72, the leaf spring 74, the stepped collar 72 and the plain washer 73 are held between the nut 76 and the load sensor 23. By fastening the nut 76, the covers 75 of both hems of the leaf spring 74 abut on the upper surface of the web 41a of the beam 41 to press the leaf spring 74 to the web 41a. Since the fastening of the nut 76 causes elastic deformation of the leaf spring 74, a load is applied on the nut 76 to prevent its loosening. As the rod 23c is inserted into the stepped collar 72, even when the nut 76 is excessively fastened, it is possible to prevent bonding of the entire leaf spring 74 to the upper surface of the web 41a caused by flat deformation of the leaf spring 74.

As the insertion hole inserted into the rod 23c is formed in the center-of-gravity of the leaf spring 74, seen to the insertion direction of the rod 23c, the rod 23c is inserted into the insertion hole in a position shifted from a line for interconnecting both hem corners of the leaf spring 74 which becomes a contact between the leaf spring 74 and the web 41a. A position of the mounting hole 41g in the width direction of the web 41a is slightly right from the center, and both hems of the leaf spring 74 are in contact with the width-direction center of the web 41a.

As shown in FIG. 2, a mounting structure of the left front load sensor 22 to the mounting hole 42f is similar to that of the right rear load sensor 23 to the mounting hole 41g, and a mounting structure of the left rear load sensor 24 to the mounting hole 42g is similar to that of the right front load sensor 21 to the mounting hole 41f. In other words, the load sensors 21 and 24 at opposite corners are fixed to the rectangular frame 40 without any play in a back-and-forth or left-and-right direction, while the load sensors 23 and 22 at other opposing corners are fixed to the rectangular frame 40 with play in back-and-forth and left-and-right directions by an amount equal to a space between the outer peripheral surface of the cylindrical part 72a and the mounting hole 41g.

In the state in which the rectangular frame 40 is mounted on the load sensors 21 to 24 as described above, the submarine pipe 10 is located on a side behind the front member 43.

As shown in FIGS. 1 to 2, a side frame 51 is welded to the right flange 41b of the beam 41, and a side frame 52 is welded to the left flange 42b of the beam 42. These side frames 51 and 52 are parts of a bottom frame of the vehicle seat.

Front parts of the side frames 51 and 52 are covered with a pan frame 53 from the above, and the side frames 51 and 52 are connected to the pan frame 53 by bolts and nuts or rivets. A sheet spring 54 is installed between a cross pipe 44 and the pan frame 53, a cushion is mounted on the pan frame 53 and the sheet spring 54, and the cushion, the pan frame 53 and the side frames 51 and 52 are entirely covered with a cover.

A backrest frame is connected to rear ends of the side frames 51 and 52 to rise and fall by a reclining mechanism. The backrest frame and the cushion are not shown for easier viewing of the drawings.

When the passenger's weight measurement device 1 is assembled, the brackets 11 and 12 and the submarine pipe 10 are fitted to the assembled slide adjuster 2, the load sensors 21 and 23 are fitted to the upper surface of the right upper rail 5, and the load sensors 22 and 24 are fitted to the upper surface of the left upper rail 6. Then, the rectangular frame 40 is fitted to the load sensors 21 to 24 by using the NYLON bushings 61 and 71, the stepped collars 62 and 72, the plain washers 63 and 73, the leaf springs 64 and 74, and the nuts 66 and 76. When the rectangular frame 40 is fitted, even when positions of the load sensors 21, 23, 22 and 24 are not aligned with those of the mounting holes 41f, 41g, 42f and 42g as designed, errors can be eliminated as the diameters of the rods 21c and 24c are smaller than the inner diameter of the stepped collar 62 in the right front and left rear load sensors 21 and 24.

When the assembled passenger's weight measurement device 1 is fitted to a vehicle, the brackets 31 to 34 of the slide adjuster 2 are mounted to a floor in the vehicle by bolts and nuts or rivets. If positions of mounting parts of the brackets 31 to 34 are not aligned with designed positions of the brackets 31 to 34, when the brackets 31 to 34 are mounted to the floor, the slide adjuster 2 or the like is slightly distorted. However, as the right rear load sensor 23 and the left front load sensor 22 are set to play in the back-and-forth and left-and-right directions of the rectangular form 40, even when the slide adjuster 2 or the like is distorted, the load sensors 22 and 23 are horizontally shifted from the rectangular frame 40 to prevent application of an initial load on the load sensors 21 to 24 caused by distortion. Moreover, as the rectangular frame 40 is shifted vertically with respect to the load sensors 21 to 24 by the stepped collars 62 and 72, application of an initial load on the load sensors 21 to 24 caused by distortion of the slide adjuster 2 or the like is prevented. Even when the load sensors 21 to 24 are shifted with respect to the rectangular frame 40, as the leaf springs 64 and 74 are present between the nuts 66 and 76 and the webs 41a and 42a, the load sensors 21 to 24 are not loosened with respect to the rectangular frame 40 thereby causing no rigidity problem.

According to the passenger's weight measurement device 1 configured as described above, when a passenger sits on the seat bottom, a weight of the passenger is applied through the rectangular frame 40 on the load sensors 21 to 24, and converted into an electric signal by the load sensors 21 to 24.

Because of the configuration in which the right load sensors 21 and 23 are mounted between the upper rail 5 and the rectangular frame 40, the left load sensors 22 and 24 are mounted between the upper rail 6 and the rectangular frame 40, and the load sensors 21 to 24 move back and forth integrally with the vehicle seat, irrespective of the back-and-forth position of the vehicle seat, a load input from the vehicle seat to the load sensors 21 to 24 can always be maintained constant. Accordingly, it is possible to improve measuring accuracy of passenger's weight.

As the submarine pipe 10 is located behind the front member 43, when front collision or the like of the vehicle applies a forward inertial force on the passenger, a buttocks of the passenger sitting on the vehicle seat is held by the submarine pipe 10. Thus, it is possible to prevent a so-called submarine phenomenon in which the passenger gets under a waist belt.

As the submarine pipe 10 is disposed separately from the front member 43, the buttocks of the passenger do not come into contact with the front member 43 at the time of front collision or the like of the vehicle. Accordingly, the forward inertial force at the time of front collision or the like of the vehicle is prevented from being transmitted through the rectangular frame 40 to the load sensors 21 to 24. Thus, even at the time of front collision or the like of the vehicle, it is possible to improve measuring accuracy of the passenger's weight.

None of the flanges 41b, 41c, 42b and 42c are disposed in the front end of the beams 41 and 42, only the webs 41a and 42a are present. The notches 41e and 42e are formed in the front ends 41d and 42d of the webs 41a and 42a, and the front member 43 is mounted in front of the notches 41e and 42d. Accordingly, when a large load is applied on the rectangular frame 40 at the time of front collision or the like of the vehicle, the beams 41 and 42 are deformed at the notches 41e and 42d, whereby the load is reduced at the deformed places. Hence, even when the large load is applied on the rectangular frame 40, transmission of the large load to the load sensors 21 to 24 is prevented. Thus, even at the time of front collision or the like of the vehicle, it is possible to improve measuring accuracy of the passenger's weight and to suppress damaging of the load sensors 21 to 24.

Second Embodiment

Figure 11:
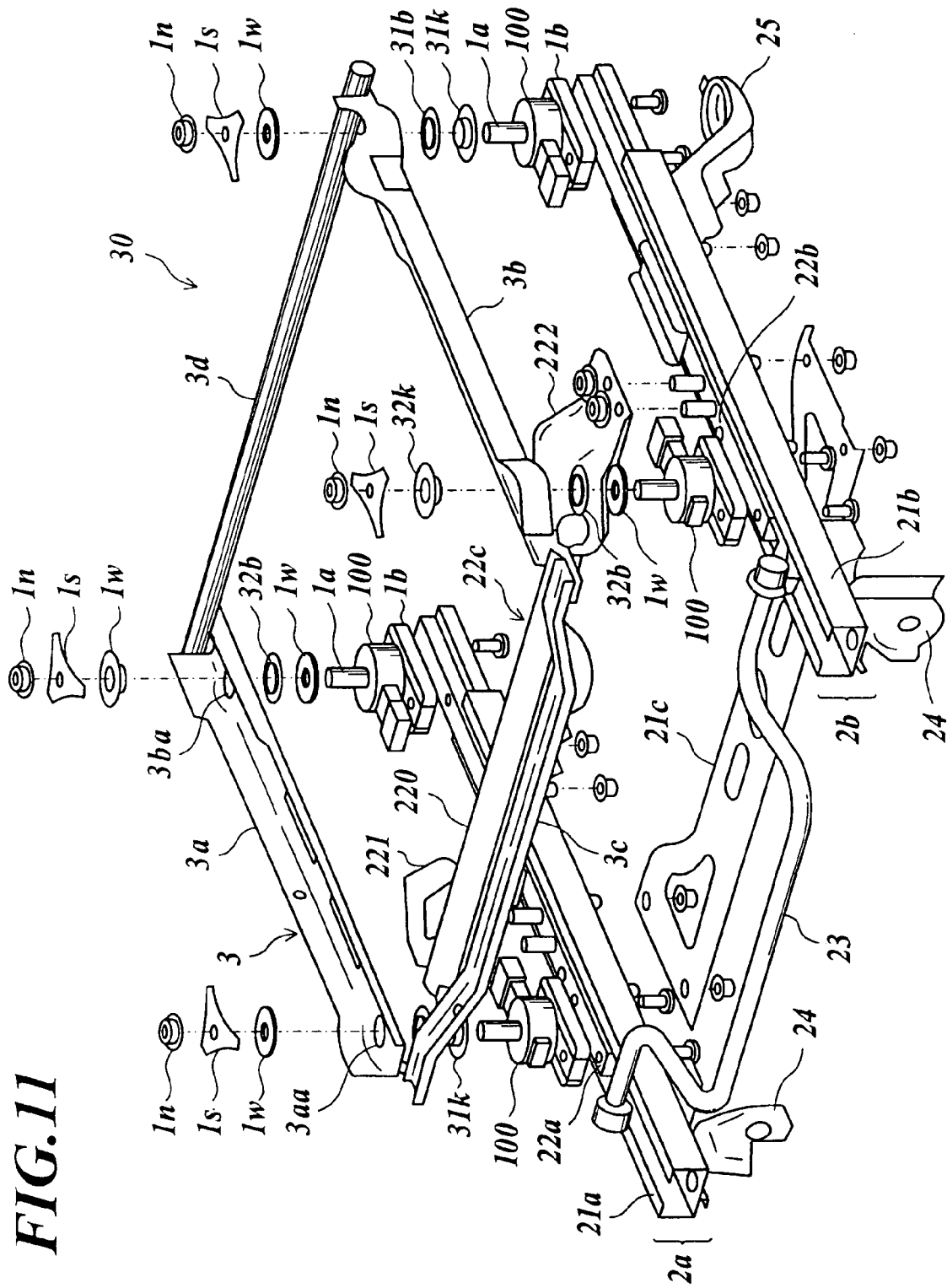
FIG. 11 is an exploded perspective assembly diagram showing a passenger's weight measurement device according to a second embodiment.
Figure 12:
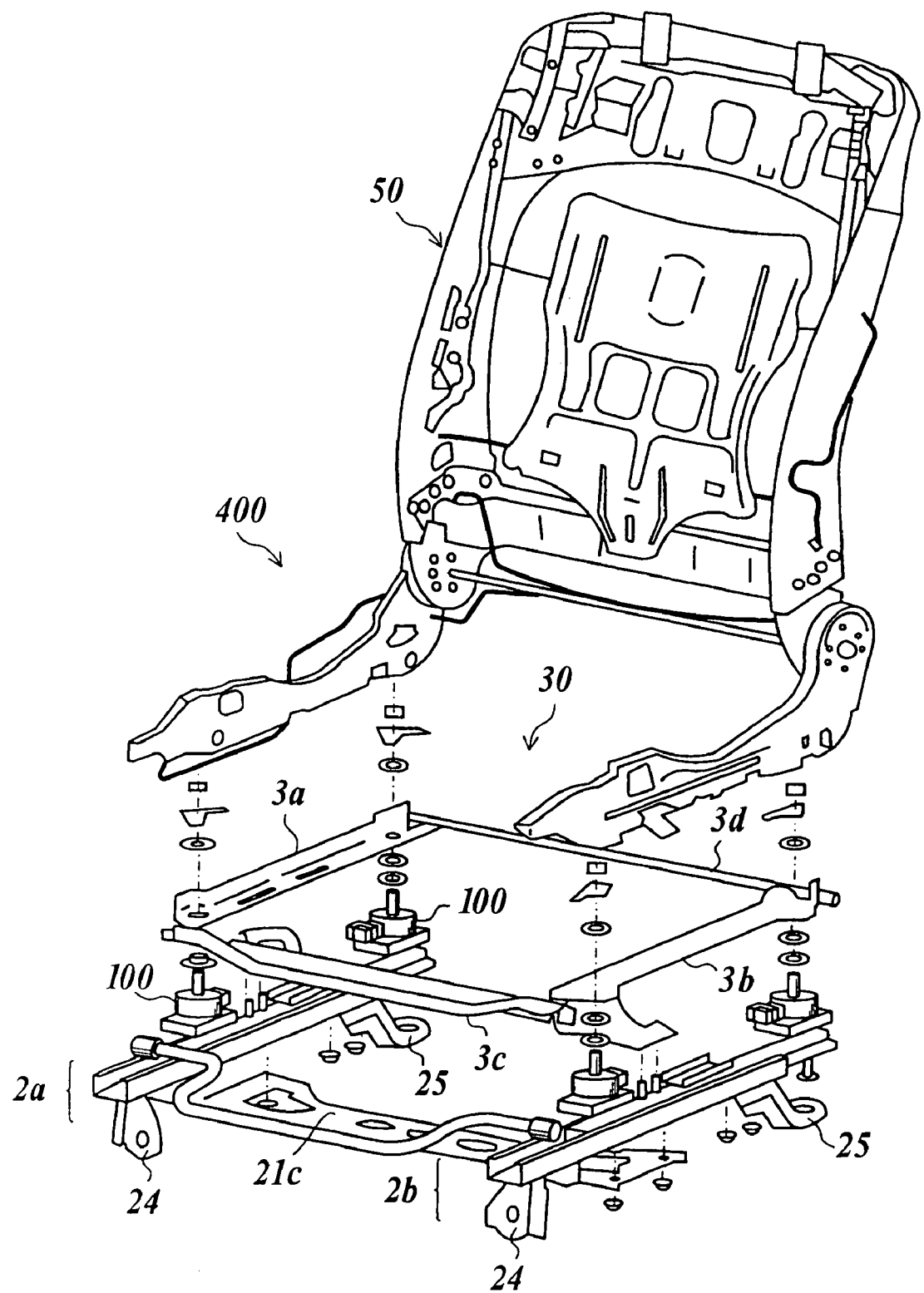
FIG. 12 is an exploded perspective diagram showing a seat section including the passenger's weight measurement device of the second embodiment.
Figure 13:
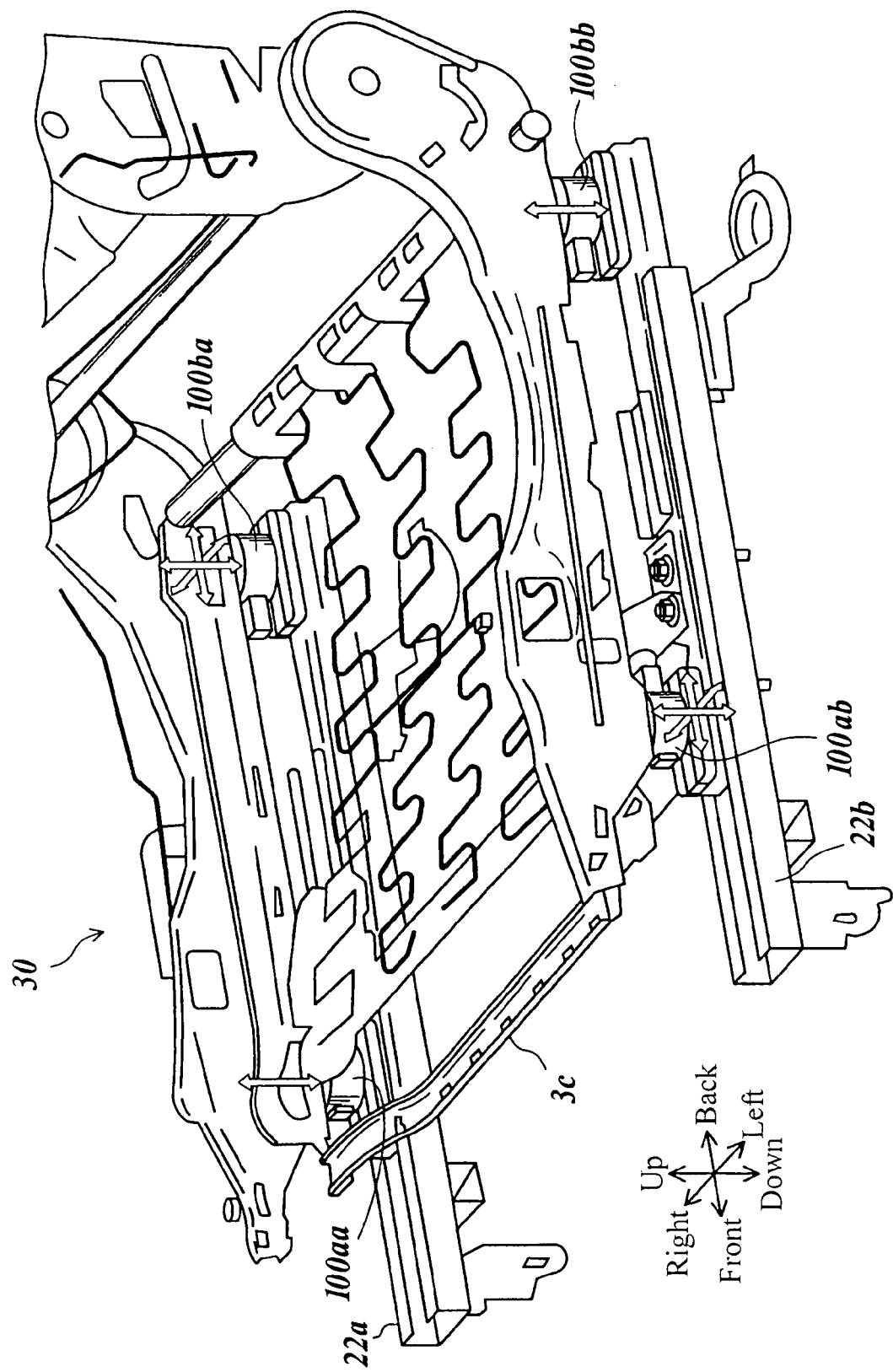
FIG. 13 is a perspective appearance diagram showing the passenger's weight measurement device of the second embodiment.
Figure 14:
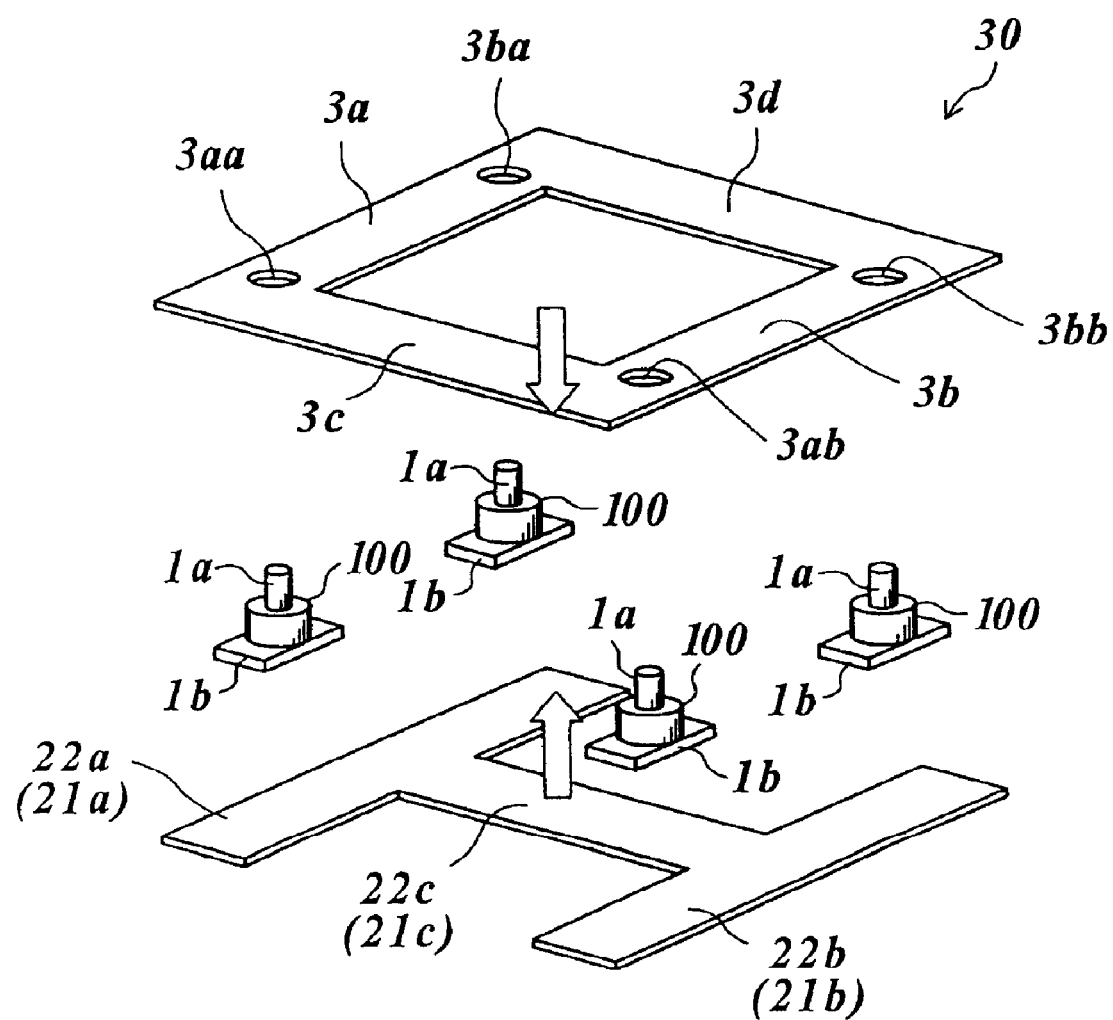
FIG. 14 is a perspective appearance diagram showing a schematic configuration of the passenger's weight measurement device of the second embodiment.
Figure 15:
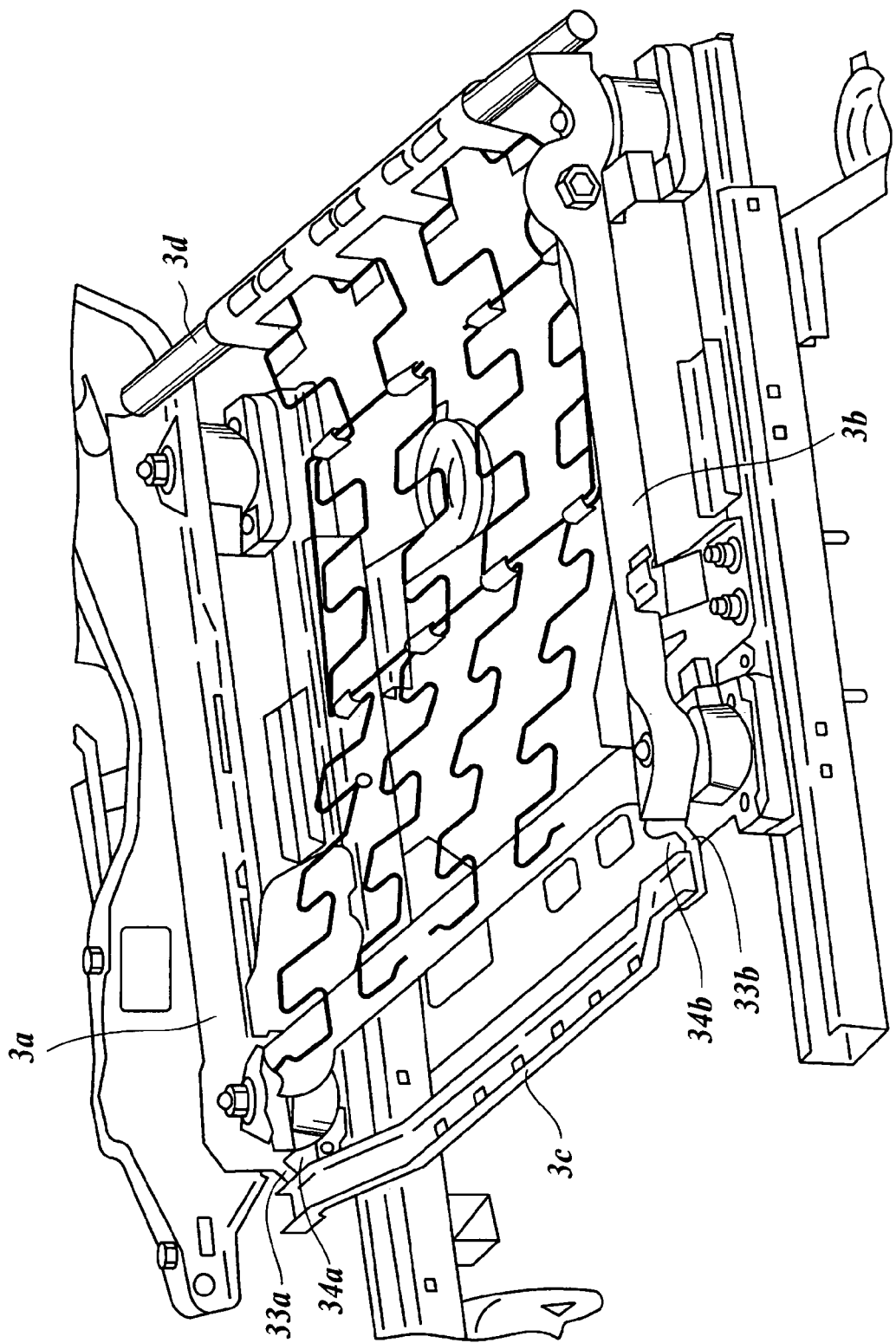
FIG. 15 is a perspective appearance diagram showing the passenger's weight measurement device of the second embodiment.
Figure 16:
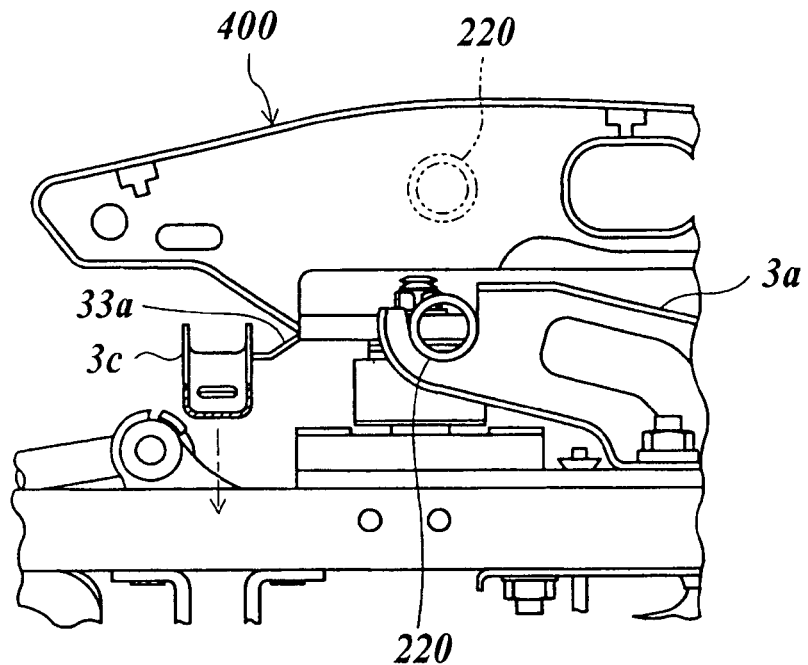
FIG. 16 is an enlarged longitudinal sectional diagram of a main section of FIG. 15.
Figure 17:
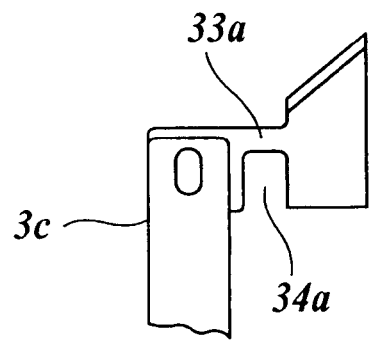
FIG. 17 is an enlarged plan diagram of a main section of FIG. 16.

FIG. 11 is an exploded perspective assembly diagram showing a passenger's weight measurement device according to a second embodiment. FIG. 12 is an exploded perspective assembly diagram of a seat section including the passenger's weight measurement device of the second embodiment. FIG. 13 is a perspective appearance diagram showing the passenger's weight measurement device of the second embodiment. FIG. 14 is a perspective appearance diagram showing a schematic configuration of the passenger's weight measurement device of the second embodiment. FIG. 15 is a perspective appearance diagram showing the passenger's weight measurement device of the second embodiment. FIG. 16 is a longitudinal sectional diagram of an enlarged main section of FIG. 15. FIG. 17 is a plan diagram of an enlarged main section of FIG. 16.

Figure 18:
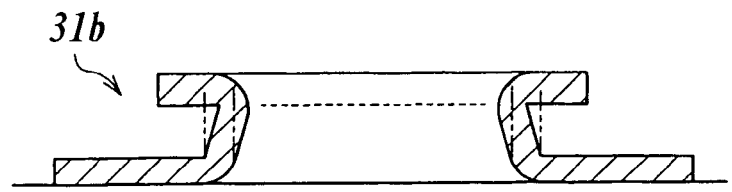
FIG. 18 is a longitudinal sectional diagram showing the first elastic bushing applied to the passenger's weight measurement device of the second embodiment.
Figure 19:
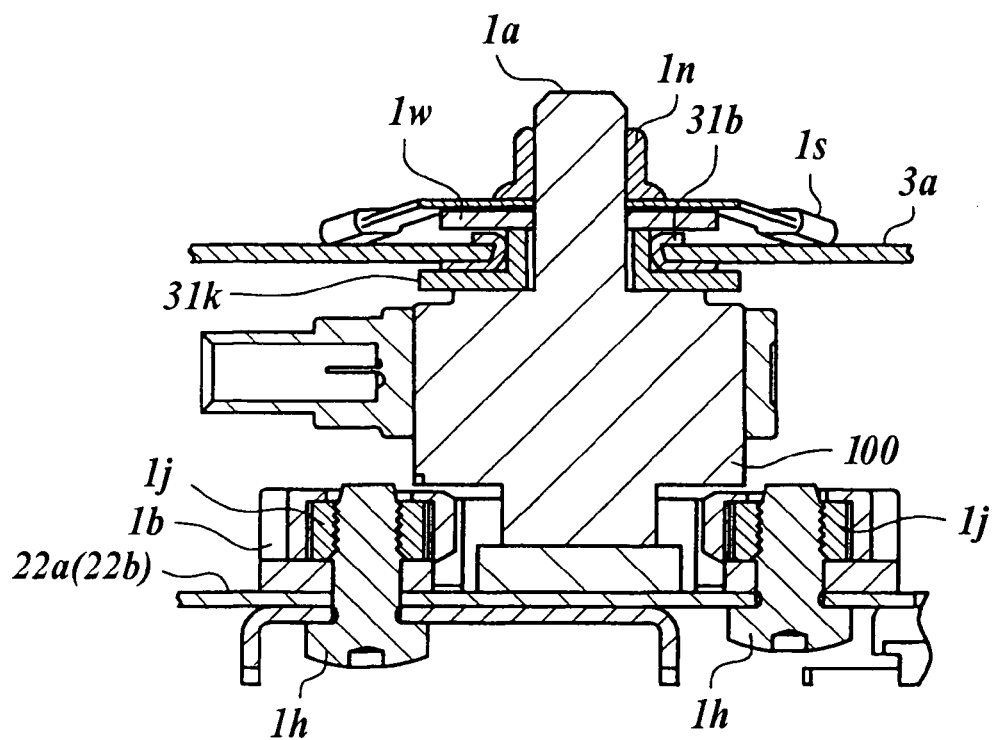
FIG. 19 is a longitudinal sectional diagram of a load cell located on one diagonal line in the passenger's weight measurement device of the second embodiment.
Figure 20:
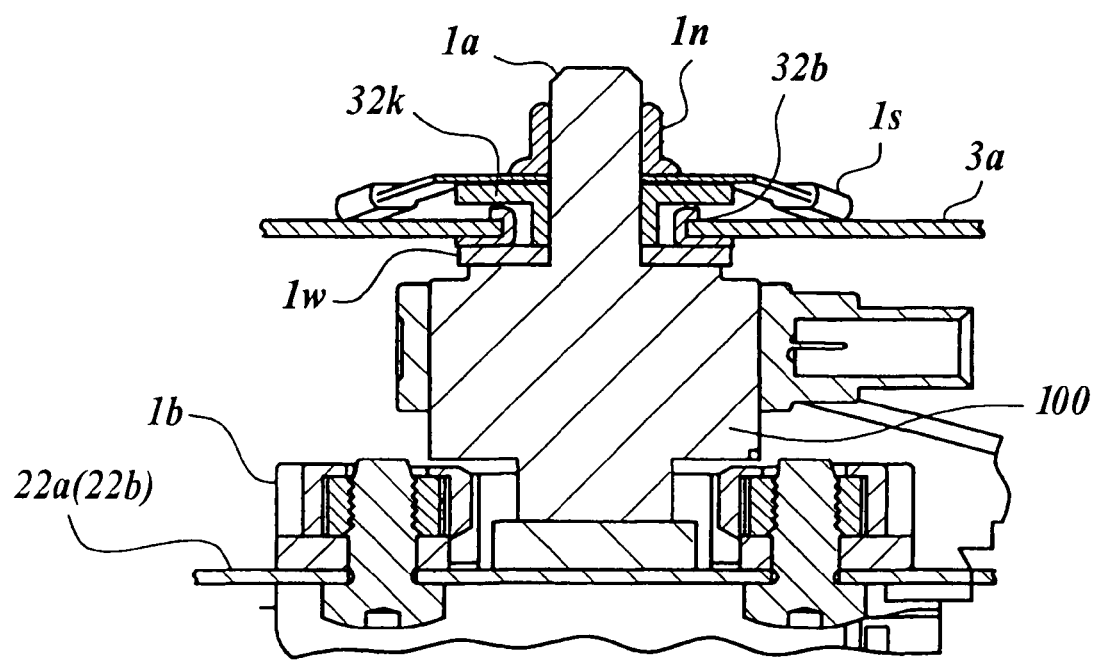
FIG. 20 is a longitudinal sectional diagram of a load cell located on the other diagonal line in the passenger's weight measurement device of the second embodiment.

FIG. 18 is a longitudinal sectional diagram of a first elastic bushing applied to the passenger's weight measurement device of the second embodiment. FIG. 19 is a longitudinal sectional diagram of a load cell located on one diagonal line in the passenger's weight measurement device of the second embodiment. FIG. 20 is a longitudinal sectional diagram of a load cell located on the other diagonal line in the passenger's weight measurement device of the second embodiment.

Referring to FIGS. 11 and 12, a pair of slide rails 2a and 2b are arranged in a vehicle floor. A seat includes a seat 400 and a backrest 50, and the seat 400 is supported by a pair of side frames 3a and 3b. Load cells 100 are disposed at four corners of the pair of slide rails 2a and 2b and the pair of side frames 3a and 3b. A seat frame 30 includes a pair of side frames 3a and 3b extending in parallel, and a set of first connection frames 3c and 3d for connecting both ends of the pair of side frames 3a and 3b to be perpendicular to the side frames 3a and 3b. In the pair of slide rails 2a and 2b, a pair of first slide rails 21a and 21b and a pair of second slide rails 22a and 22b are connected so as to be respectively slidable.

The passenger's weight measurement device is usually disposed in a passenger seat of a vehicle to detect a weight of a passenger of the seat. An airbag system mounted on the passenger seat is controlled corresponding to a detection signal obtained by the passenger's weight measurement device. It is possible to estimate the weight of the passenger of the seat via the passenger's weight measurement device provided between the seat 400 and the vehicle floor. In FIG. 12, cushions of the seat 400 and the backrest 50 are omitted.

Referring to FIGS. 11 and 12, the pair of side frames 3a and 3b are C channel members in which both wings are bent. Such a C channel member can effectively enlarge sectional secondary moment by contriving the shapes without increasing weight, and rigidity to a bending force can be improved. The pair of side frames 3a and 3b are arranged in the vehicle with bent pieces of both wings set upward.

Referring to FIGS. 11 and 12, the first connection frame 3c of the set of first connection frames 3c and 3d is made of a C channel member in which both wings are bent. Both ends of the first connection frame 3c are connected to one end of the pair of the side frames 3a and 3b. The pair of side frames 3a and 3b and the first connection frame 3c are connected together by fasteners such as screws. The first connection frame 3d of the set of first connection frames 3c and 3d is a round pipe. Both ends of this round pipe are connected to the other ends of the pair of side frames 3a and 3b.

Referring to FIGS. 11 and 12, the pair of first slide rails 21a and 21b extend in parallel to be fixed to the vehicle floor side. The pair of first slide rails 21a and 21b include a second connection frame 21c for connecting middle parts of the pair of first slide rails 21a and 21b to be perpendicular to the first slide rails 21a and 21b. The pair of first slide rails 21a and 21b each includes a slide locking device not shown in the drawings, and a lever 23 is connected to operate the slide locking device. The seat 400 can be slid by gripping the lever 23. The pair of second slide rails 22a and 22b extend in parallel and include a third connection frame 22c for connecting middle parts of the pair of second slide rails 22a and 22b to be perpendicular to the second slide rails 22a and 22b.

Referring to FIGS. 11 and 12, both ends of the pair of first slide rails 21a and 21b are fixed to the vehicle floor via a pair of support brackets 24 and 25. The second connection frame 21c is a wide C channel member, and both ends of the second connection frame 21c are connected to the middle parts of the pair of first slide rails 21a and 21b.

Referring to FIGS. 11 and 12, the third connection frame 22c includes a round pipe 220 and a pair of angle members 221 and 222, and the angle members 221 and 222 are connected to both ends of the round pipe 220 so that pieces thereof can face each other. For example, the angle members 221 and 222 and the round pipe 220 may be bonded together by welding, or caulking. The other pieces of the angle members 221 and 222 are connected to the middle parts of the pair of second slide rails 22a and 22b. Both ends of the third connection frame 22c are connected to the middle parts of the pair of second slide rails 22a and 22b by fasteners such as screws.

Referring to FIG. 14, the pair of side frames 3a and 3b and the set of first connection frames 3c and 3d are connected together so that a highly rigid rectangular seat frame 30 can be obtained. The seat frame 30 holds the seat 400 (FIG. 12). In this case, high rigidity of the seat frame 30 may mean that distortion of the seat frame 30 is small with respect to a force applied on the seat frame 30, for example, displacement of the pair of side frames 3a and 3b is small with respect to a force (compression stress) applied in a mutually approaching direction of the pair of side frames 3a and 3b, or displacement of the pair of side frames 3a and 3b is small with respect to a force (tension stress) applied in a mutually separating direction of the pair of side frames 3a and 3b.

Referring to FIG. 14, the pair of first slide rails 21a and 21b and the second connection frame 21c are connected together to obtain a highly rigid H-shaped frame (H-frame). The pair of second slide rails 22a and 22b and the third connection frame 22c are connected together to obtain a highly rigid H-frame. The high rigidity of the H-frame may mean that distortion of the H-frame is small with respect to a force applied on the H-frame, for example, displacement of the pair of slide rails 2a and 2b is small with respect to a force (compression stress) applied in a mutually approaching direction of the pair of slide rails 2a and 2b, or displacement of the pair of slide rails 2a and 2b is small with respect to a force (tension stress) applied in a mutually separating direction of the pair of slide rails 2a and 2b (FIGS. 11 and 12).

Referring to FIGS. 11 and 12, in the passenger's weight measurement device, four load cells 100 are arranged at four corners of the pair of second slide rails 22a and 22b. The four load cells 100 connect the seat frame 30 to the pair of second slide rails 22a and 22b.

Referring to FIGS. 11 and 12, a weight of a passenger of the seat 400 can be estimated by summing up detection values of the four load cells 100. The load cell 1 includes a male screw 1a in one end, and a flange 1b in the other end located to face one end. The male screw 1a is connected to the seat frame 30. The connection means a connection to enable up-and-down movement in an axial direction, or a connection to enable up-and-down movement in axial and circumferential directions. The flange 1b is connected to the pair of second slide rails 22a and 22b. The flange 1b is connected to the pair of second slide rails 22a and 22b by a fastener constituted of a hexagon socket bolt 1h and a nut 1j (FIG. 19).

According to the passenger's weight measurement device of the present invention, the pair of side frames 3a and 3b supporting the seat and the set of the first connection frames 3c and 3d are interconnected to obtain the highly rigid rectangular frame seat frame 30. The pair of slide rails 21a and 21b and the second connection frame 21c are interconnected to obtain the highly rigid H-frame, and the pair of slide rails 22a and 22b and the third connection frame 22c are interconnected to obtain the highly rigid H-frame. For example, the pair of side frames 3a and 3b move in a mutually separating direction to enable prevention of tilting of the load cells 100. According to the present invention, it is possible to provide the passenger's weight measurement device capable of preventing interferences with load measurement of the load cells without increasing the number of components and without greatly changing the framework of the conventional seat structure.

Referring to FIG. 13, in the passenger's weight measurement device of the present invention, among the four load cells 100aa, 100ab, 100ba and 100bb the pair of load cells 100aa and 100bb located on one diagonal line are connected to the seat frame 30 to be movable up and down. The pair of load cells 100ab and 100ba located on the other diagonal line are connected to the seat frame 30 to be movable up and down and play. Four load cells, 1aa, 1ab, 1ba, and 1bb shown in FIG. 13 are the same as the load cells 100 shown in FIGS. 11 and 12, but they are denoted by reference numerals to be differentiated for convenience of explanation.

As described above, the load cell 1 includes the male screw 1a in one end, and the flange 1b in the other end located to face one end (FIG. 14). In FIG. 13, the connection of the pair of load cells 100aa and 100bb to the seat frame 30 to be movable up and down is equivalent to connection of the pair of male screws 1a and 1a to the seat frame 30 to move up and down. The connection of the pair of load cells 100ab and 100ba to the seat frame 30 to move up and down and play is equivalent to connection of the pair of male screws 1a and 1a to the seat frame 30 to be movable and play up and down.

The passenger's weight measurement device of the present invention can absorb manufacturing errors of the pair of slide rails 22a and 22b, the four load cells 100, and the pair of side frames 3a and 3b, and height-direction accumulated errors of these components. The device can also absorb assembling errors of the pair of slide rails 22a and 22b, the four load cells 100 and the seat frame 30. The up-and-down movable connection structure and the up-and-down movable and playable connection structure should preferably be realized by general mechanical elements such as bushings or washers without using any special mechanical elements. A specific embodiment will be described below.

According to the passenger's weight measurement device of the present invention, among the set of first connection frames 3c and 3d, the first connection frame 3c is connected to one end of the pair of side frames 3a and 3b to be easily deformed by shocks having a predetermined or more strength (FIG. 15).

Referring to FIG. 15, in the pair of side frames 3a and 3b, a pair of tongue pieces 33a and 33b extend to one end. The first connection frame 3c is connected to tips of the pair of tongue pieces 33a and 33b. Constricted parts 34a and 34b are disposed in base ends of the pair of tongue pieces 33a and 33b (FIG. 17). Stress due to shocks concentrates on the pair of constricted parts 34a and 34b. Accordingly, it is possible to protect the load cells from shocks having a predetermined or more strength by employing the structure to be easily deformed by shocks having a predetermined or more strength.

As shown in FIG. 16, the pair of cushion frames constituting the seat 400 are connected to the round pipe 220. However, according to the passenger's weight measurement device of the present invention, the pair of second slide rails 22a and 22b are connected together by the round pipe 220 (FIG. 11). Thus, by changing the fixation of the round pipe 220 for receiving a load of the passenger during collision from the pair of cushion frames to the pair of second slide rails 22a and 22b, it is possible to protect the load cells from shocks having a predetermined or more strength.

Next, a load cell mounting structure of the passenger's weight measurement device of the present invention will be described.

Referring to FIG. 14, the load cell 1 includes the male screw 1a in one end. The load cell 1 includes the flange 1b in the other end located to face one end. In the seat frame 30, four holes 3aa, 3ab, 3ba and 3bb for entering male screws are formed corresponding to the arrangement of the four load cells 100. The pair of second slide rails 22a and 22b fix the flanges 1b.

Referring to FIGS. 14 and 19, first elastic bushings 31b are inserted into the pair of first holes 3aa and 3bb located on one diagonal line. A first collar 31k is elastically provided between the first elastic bushing 31b and the male screw 1a. A plain washer 1w and a conical spring washer 1s are mounted on the first collar 31k, and a nut 1n is connected to the male screw 1a.

For example, the first elastic bushing is made of a synthetic resin such as NYLON (registered trademark). The bushing is a ring-shaped member, and called a grommet. The bushing includes a groove in an outer peripheral direction, and this groove is engaged with peripheral edges of the first holes 3aa and 3bb. For example, the insertion of the first elastic bushings 31b into the pair of first holes 3aa and 3bb may be press-insertion of the first elastic bushings into the first holes 3aa and 3bb. An inner periphery of the first elastic bushing 31b elastically abuts on an outer periphery of the first collar 31k (FIG. 19).

Referring to FIG. 19, in a portion of the seat frame 30, which is engaged with the pair of male screws located on one diagonal line, the up-and-down moving amount thereof is defined by an axial-direction length of the first collar 31k. The conical spring washer 1s presses the seat frame 30 to the load cell 1 side.

Referring to FIG. 19, the first collar 31k includes a circular flange in on end. The first collar 31k is inserted into the male screw 1a from this flange. Then, the first collar 31k is inserted into the first hole 3aa and 3bb equipped with the first elastic bushings 31b. At this time, one surface of the first elastic bushing 31b abuts on the flange of the first collar 31k. The plain washer 1w is inserted into the male screw 1a. At this time, for example, the other surface of the first elastic bushing 31b is separated from the plain washer 1w while the plain washer 1w abuts on the other end of the first collar 31k. Subsequently, the conical spring washer 1s is mounted, and the nut 1n is connected to the male screw 1a. The nut 1n is preferably a torque nut.

According to the passenger's weight measurement device of the present invention, it is possible to realize the up-and-down movable structure by general mechanical elements without using any special mechanical elements. Besides, it is possible to absorb manufacturing errors of the pair of slide rails 22a and 22b, the four load cells 100, and the pair of side frames 3a and 3b, and height-direction accumulated errors of these components.

Referring to FIGS. 14 and 20, the second elastic bushing 32b is inserted into the pair of second holes 3ab and 3ba located on the other diagonal line. The second elastic bushing 32b includes a groove disposed in an outer peripheral direction, and this groove is engaged with peripheral edges of the second holes 3ab and 3ba. For example, the insertion of the second elastic bushings 32b into the pair of second holes 3ab and 3ba may be press-insertion of the second elastic bushings 32b into the second holes 3ab and 3ba. In FIG. 20, an inner diameter of the second elastic bushing 32b is larger than an outer diameter of the second collar 32k, and the second elastic bushing 32b holds the second collar 32k to play. The play may be movement with play, and it is possible to absorb manufacturing errors of the pair of slide rails 22a and 22b, the four load cells 100 and the pair of side frames 3a and 3b, and horizontal assembling errors of these components.

Referring to FIGS. 14 and 20, the plain washer 1w is first inserted into the male screw part 1a. Then, the second holes 3ab and 3ba equipped with the second elastic bushings 32b are inserted into the male screws 1a. The second collar 32k includes a circular flange in one end. The second collar 32k is inserted into the male screw 1a with this flange as a tail end. At this time, for example, an outer periphery of the second collar 32k is separated from an inner periphery of the second elastic bushing 32b. The conical spring washer is mounted, and the nut in is connected to the male screw 1a. For example, the first and second elastic bushings 31b and 32b may be identical, and used by changing an insertion order and direction into the male screws 1a.

According to the passenger's weight measurement device of the present invention, it is possible to realize the up-and-down movable and playable structure by general mechanical elements without using any special mechanical elements. Moreover, it is possible to absorb manufacturing errors of the pair of slide rails 22a and 22b, the four load cells 100, and the pair of side frames 3a and 3b, and height-direction accumulated errors of these components.

Referring to FIG. 18, the inner diameter of the first elastic bushing 31b is formed into a conical shape, and an inner periphery of an upper bottom surface of the conical form of a small radius abuts on the outer periphery of the first collar 31k (FIG. 19). Thus, it is possible to simultaneously achieve assembling easiness and assembling error absorption by forming the inner diameter of the first elastic bushing 31b into the conical shape.

According to the passenger's weight measurement device of the present invention, the pair of side frames 3a and 3b supporting the seat are connected to the set of first connection frames 3c and 3d to obtain a highly rigid rectangular frame seat frame 30. The pair of slide rails 21a and 21b and the second connection frame 21c are connected together to obtain a highly rigid H-frame. The pair of slide rails 22a and 22b and the third connection frame 22c are connected together to obtain a highly rigid H-frame. For example, the pair of side frames 3a and 3b move in a mutually separating direction to enable prevention of tilting of the load cells 100. According to the present invention, it is possible to provide the passenger's weight measurement device capable of preventing interferences with load measurement of the load cells without increasing the number of components and without greatly changing the framework of the conventional seat structure.

According to the passenger's weight measurement device of the present invention, it is possible to absorb manufacturing errors of the pair of slide rails 22a and 22b, the four load cells 100, and the pair of side frames 3a and 3b, and height-direction accumulated errors of these components. Besides, it is possible to absorb horizontal accumulated errors of these components caused by assembling.

The present invention is not limited to the first and second embodiments. Various improvements and design changes can be made without departing from the gist of the invention.

What is claimed is:

1. An attachment structure for attaching a load sensor to a frame disposed below a vehicle seat,
    wherein a rod extends from the load sensor to penetrate the frame and to be inserted into an insertion hole formed in a center of a leaf spring, the leaf spring is curved into an angle shape to separate the center of the leaf spring from the frame, a nut is engaged with the rod on the leaf spring, and both hems of the leaf spring abut on the frame in a state that the leaf spring is fastened by the nut.

2. The attachment structure as claimed in claim 1, wherein a collar through which the rod is inserted penetrates the frame, the leaf spring is held between the collar and the nut, and the leaf spring and the collar are held between the nut and the load sensor.

3. The attachment structure as claimed in claim 1, wherein the rod is inserted into the insertion hole in a position shifted from a line segment for interconnecting the both hems of the leaf spring when seen towards an inserting direction of the rod.

4. The attachment structure as claimed in claim 1, wherein holes are formed in the both hems of the leaf spring, and a part of a cover covering the both hems of the leaf spring is inserted into the holes.

5. A passenger's weight measurement device on a vehicle seat, comprising:
    an upper rail disposed to be movable back and forth on a lower rail fixed to a vehicle floor;
    a load sensor fixed on the upper rail; and
    a frame disposed on the load sensor and below a vehicle seat,
    wherein a rod extends from the load sensor to penetrate the frame and to be inserted into an insertion hole formed in a center of a leaf spring, the leaf spring is curved into an angle shape to separate the center of the leaf spring from the frame, a nut is engaged with the rod on the leaf spring, and both hems of the leaf spring abut on the frame in a state that the leaf spring is fastened by the nut.

6. The measurement device as claimed in claim 5,
    wherein a collar through which the rod is inserted penetrates the frame, the leaf spring is held between the collar and the nut, and the leaf spring and the collar are held between the nut and the load sensor.

7. The measurement device as claimed in claim 5,
    wherein the rod is inserted into the insertion hole in a position shifted from a line segment for interconnecting the both hems of the leaf spring when seen towards an inserting direction of the rod.

8. The measurement device as claimed in claim 5,
    wherein holes are formed in the both hems of the leaf spring, and a part of a cover covering the both hems of the leaf spring is inserted into the holes.

9. A passenger's weight measurement device on a vehicle seat, comprising:
    a pair of left and right upper rails disposed to be movable back and forth on a pair of left and right lower rails fixed to a vehicle floor;
    four load sensors fixed on front and rear sides of the pair of upper rails; and
    a frame disposed on the four load sensors and below the vehicle seat,
    wherein two of the four load sensors, which are arranged on one diagonal line, are set to play in back-and-forth and left-and-right directions with respect to the frame, and the other two load sensors arranged on the other diagonal line are fixed in back-and-forth and left-and-right directions with respect to the frame.

10. A passenger's weight measurement device on a vehicle seat, comprising:
    a pair of slide rails arranged in a vehicle floor;
    a pair of side frames for supporting the seat and disposed above the pair of slide rails; and load cells disposed at four corners of the pair of slide rails and disposed between the pair of slide rails and the pair of side frames, wherein the pair of side frames constitute a rectangular seat frame with a set of first connection frames for connecting both ends of the pair of side frames extending in parallel so as to be perpendicular to the pair of side frames, and wherein a pair of load cells located on one diagonal line among the four load cells are connected to be movable up and down with respect to the seat frame, and a pair of load cells located on the other diagonal line are connected to be movable up and down and play with respect to the seat frame.

* * * * *